(12) United States Patent
Curtzwiler et al.

(10) Patent No.: US 12,365,821 B2
(45) Date of Patent: Jul. 22, 2025

(54) **BIO-BASED COATINGS AND ADHESIVES USING OILS OF *PHYSARIA fendleri* AND *EUPHORBIA LAGASCAE***

(71) Applicant: IOWA STATE UNIVERSITY RESEARCH FOUNDATION, INC., Ames, IA (US)

(72) Inventors: Greg Curtzwiler, Boone, IA (US); Keith Vorst, Madrid, IA (US); Alexandra Ivey, Ames, IA (US); Sharan Raman, Wheaton, IL (US)

(73) Assignee: IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 0 days.

(21) Appl. No.: 18/638,073

(22) Filed: Apr. 17, 2024

(65) Prior Publication Data

US 2024/0279519 A1    Aug. 22, 2024

Related U.S. Application Data

(62) Division of application No. 17/204,475, filed on Mar. 17, 2021, now Pat. No. 11,993,733.

(Continued)

(51) Int. Cl.
*C09J 175/14*    (2006.01)
*C08G 18/32*    (2006.01)
(Continued)

(52) U.S. Cl.
CPC ........ *C09J 175/14* (2013.01); *C08G 18/3218* (2013.01); *C08G 18/4277* (2013.01);
(Continued)

(58) Field of Classification Search
None
See application file for complete search history.

(56) References Cited

U.S. PATENT DOCUMENTS

| | | | | |
|---|---|---|---|---|
| 6,881,769 B1 * | 4/2005 | Grob | ............... | C09D 163/00 |
| | | | | 524/904 |
| 8,722,752 B2 * | 5/2014 | Kuwamura | ........ | C08G 18/7837 |
| | | | | 528/65 |

(Continued)

OTHER PUBLICATIONS

Contreras et al., 'Development of eco-friendly polyurethane foams based on Lesquerella Fendleri oil based polyol', Mar. 11, 2020, Elsevier, European Polymer Journal vol. 128 (Year: 2020).*

(Continued)

*Primary Examiner* — Michael N Orlando
*Assistant Examiner* — Abhishek A Patwardhan
(74) *Attorney, Agent, or Firm* — Troutman Pepper Locke LLP (Rochester)

(57) ABSTRACT

The present application relates to polyurethane polymers produced by polymerizing a reactant mixture comprising triglycerides of *Physaria fendleri*, one or more polyisocyanates, and one or more polyols, wherein the triglycerides of *Physaria fendleri* have a hydroxyl value ranging from 90 milligrams of potassium hydroxide per gram of the triglycerides of *Physaria fendleri* to 250 milligrams of potassium hydroxide per gram of the triglycerides of *Physaria fendleri*. The present application also relates to polyester polymers produced by polymerizing a reactant mixture comprising triglycerides of *Euphorbia lagascae*, and one or more dicarboxylic acids. Also disclosed are the methods of formation of the polyurethane and polyester polymers, and their use as adhesives.

18 Claims, 22 Drawing Sheets

Related U.S. Application Data

(60) Provisional application No. 62/991,167, filed on Mar. 18, 2020.

(51) Int. Cl.

| | |
|---|---|
| *C08G 18/42* | (2006.01) |
| *C08G 18/67* | (2006.01) |
| *C08G 18/72* | (2006.01) |
| *C08G 18/73* | (2006.01) |
| *C08G 63/52* | (2006.01) |
| *C08G 63/81* | (2006.01) |
| *C09J 5/00* | (2006.01) |
| *C09J 11/04* | (2006.01) |
| *C09J 167/08* | (2006.01) |

(52) U.S. Cl.
CPC ......... *C08G 18/675* (2013.01); *C08G 18/728* (2013.01); *C08G 18/73* (2013.01); *C08G 63/52* (2013.01); *C08G 63/81* (2013.01); *C09J 5/00* (2013.01); *C09J 11/04* (2013.01); *C09J 167/08* (2013.01); *C09J 2467/00* (2013.01); *C09J 2475/00* (2013.01)

(56) References Cited

U.S. PATENT DOCUMENTS

| | | | | |
|---|---|---|---|---|
| 10,384,466 | B1* | 8/2019 | Hill | B29C 64/165 |
| 2001/0023276 | A1* | 9/2001 | Schoenfeld | C08G 59/42 |
| | | | | 525/107 |
| 2011/0269863 | A1* | 11/2011 | Kunst | C08G 18/10 |
| | | | | 568/679 |
| 2014/0275310 | A1* | 9/2014 | Adkins | C08G 71/04 |
| | | | | 528/361 |
| 2018/0344898 | A1* | 12/2018 | Kronenthal | A61L 27/18 |
| 2019/0338326 | A1* | 11/2019 | Cuero Rengifo | C12N 9/1059 |
| 2020/0148817 | A1* | 5/2020 | Terwillegar | C08G 18/244 |
| 2021/0292623 | A1 | 9/2021 | Curtzwiler et al. | |

OTHER PUBLICATIONS

Thames, S. F., "Application of Lesquerella Oil in Industrial Coatings" Polymers from Agricultural Coproducts ACS Symposium Series, American Chemical Society, Washington, DC p. 212-222 (1994).

Thames, S. F., "Dehydration of Lesquerella Oil," J. Appl. Polym. Sci. 58(5): 943-950 (1995).

Mizera and Ryszkowska, "Polyurethane Elastomers from Polyols Based on Soybean Oil with a Different Molar Ratio," Polym. Degrad. Stab. 132:21-31 (2016).

Derksen et al., "Renewable Resources in Coatings Technology: A Review," Prog. Org. Coat. 27:45-53 (1996).

Alam et al., "Vegetable Oil Based Eco-Friendly Coating Materials: A Review Article," Arab. J. Chem. 7:469-479 (2014).

Roque et al., "Extract of Oil From Euphorbia Lagascae Seeds by Screw Pressing" Abstract (2012), https://www.ars.usda.gov/research/publications/publication/?seqNo115=285943, accessed Apr. 27, 2019.

Thames et al., "Acrylated Lesquerella Oil in Ultraviolet Cured Coatings," Prog. Org. Coat. 28:299-305 (1996).

Thames et al., "Air-dry Primer Coatings from Dehydrated Lesquerella Oil," Ind. Crops Prod. 6:169-175 (1997).

Muuse et al., "Composition and Physical Properties of Oils from New Oilseed Crops" Ind. Crops Prod. 1:57-65 (1992).

Krewson and Scott, "Euphorbia Lagascae Spreng., an Abundant Source of Epoxyoleic Acid; Seed Extraction and Oil Composition," J. Am. Oil Chem. Soc. 43:171-174 (1966).

Krewson, C.F., "Naturally Occurring Epoxy Oils" J. Am. Oil Chem. Soc. 45:250-256 (1968).

Jian et al., "All Plant Oil Derived Epoxy Thermosets with Excellent Comprehensive Properties" Macromolecules 50:5729-5738 (2017).

Blank et al., "Catalysis of the Epoxy-Carbonyl Reaction" Presentation at the International Waterborne, High-Solids and Powder Coatings Symposium, LA, New Orleans (2001).

Ciannamea and Ruseckaite, "Pressure Sensitive Adhesives Based on Epoxidized Soybean Oil: Correlation Between Curing Conditions and Rheological Properties," J. Am. Oil Chem. Soc. 95:525-532 (2018).

Brahim, et al., "Lesquerella Fendleri Seed Oil Content and Composition: Harvest Date and Plant Population Effects" Ind. Crops Prod. 5(3):245-252 (1996).

Javni, et al., "Thermoplastic Polyurethanes with Isosorbide Chain Extender" J. Appl. Polym. Sci. 132(47):2015.

Oprea, S., "Synthesis and Properties of Polyurethane Elastomers with Castor Oil as Crosslinker," J. Am. Oil Chem. Soc. 87(3):313-320 (2010).

Contreras et al., Development of Eco-friendly Polyurethane Foams Based on Lesquerella Fendleri Oil Based Polyol, Elsevier, European Polymer Journal 128(2):109606 (2020).

* cited by examiner

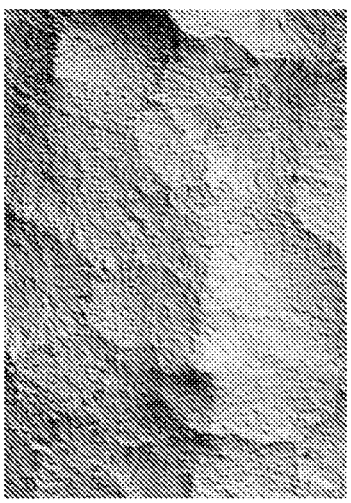
*Figure 6A*
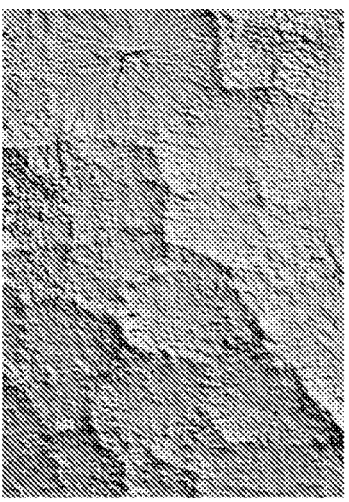
*Figure 6B*
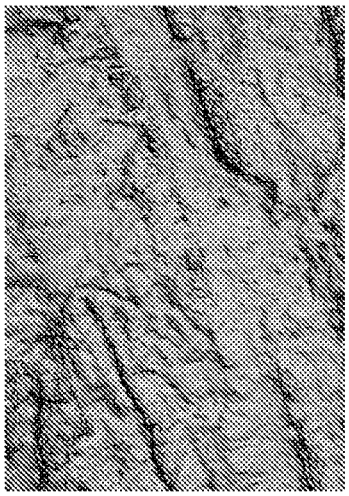
*Figure 6C*
*Figure 7A*
*Figure 7B*
*Figure 7C*

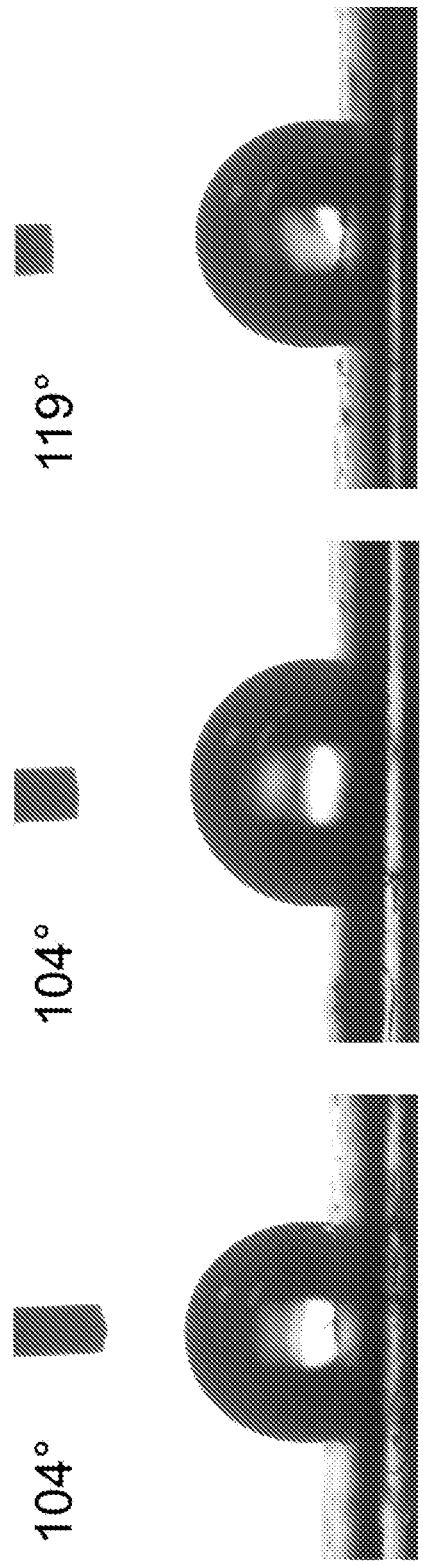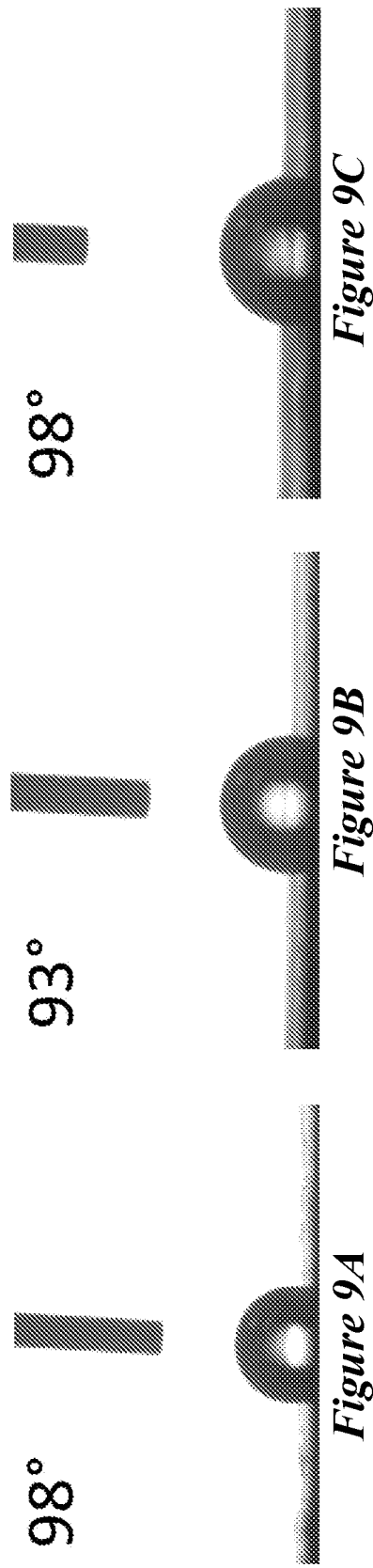

BIO-BASED COATINGS AND ADHESIVES USING OILS OF *PHYSARIA fendleri* AND *EUPHORBIA LAGASCAE*

This application is a divisional of U.S. patent application Ser. No. 17/204,475, filed Mar. 17, 2021, which claims the priority benefit of U.S. Provisional Patent Application Ser. No. 62/991,167, filed Mar. 18, 2020, which is hereby incorporated by reference in its entirety.

FIELD

The present application relates to bio-based coatings and adhesives of *Physaria fendleri*.

BACKGROUND

With an increased demand in cost-effective sustainability and safety, there is a need to replace petroleum-based coatings and adhesives with safer and renewable resources (Deka and Karak, *Prog. Org. Coat.* 66:192-198 (2009)). Plant extract oils are abundant, cost-effective, sustainable, and possess inherent chemical functional groups that provide a greener chemistry alternative (Macalino et al., *IOP Conf. Ser.: Mater. Sci. Eng.*, 229:012016/012011-012016/012016 (2017)). There is vast potential for plant oils to replace components in petroleum-based adhesives since monomers, fine chemicals, and polymers can be derived from these renewable resources (Maassen et al., *Int. J. Adhes. Adhes.* 64:65-71 (2016); Meier et al., *Chem. Soc. Rev.* 36:1788-1802 (2007)). However, most oil extracts require chemical modification prior to direct replacement of traditional petroleum feedstocks.

The demand for adhesives is anticipated to rise globally by 3.6% per year until 2024 and polyurethanes are an important class. Polyurethanes (PU) are commonly used in various applications such as foams, plastics, composites, films, sealants, coatings, inks, and adhesives and have been extensively studied with a variety of compositions (Akindoyo et al., *RSC Adv.* 6:114453-114482 (2016)). Currently, water-based *Ricinus communis* (castor) oil PU adhesives are often the most desirable for food packaging, because of the low toxicity solvent (water). However, water-based PU adhesives often exhibit poor coatability (wetting) and low adhesive force (Qiao et al., *Adv. J. Food Sci. Technol.* 12:705-708 (2016)). Therefore, there is a need for an environment-friendly, high performance adhesive for more demanding applications and substrates.

Plant oil extracts containing intrinsic hydroxyl functional groups, such as *Physaria fendleri* (*Physaria*) oil, are valuable alternative materials to petroleum-based feedstocks for PU coatings. *Physaria* oil estimated costs are $1-2 per kg which is comparable to poly(ethylene terephthalate) (~$1.7 per kg) which is considered the gold standard paper coating for rapid reheat food packaging applications.

Previous use of vegetable or plant oils for PU applications generally required various synthetic strategies to introduce hydroxyl groups into the fatty acid chain via the carbon-carbon double bonds (Akindoyo et al., *RSC Adv.* 6:114453-114482 (2016)). Therefore, plant oil extracts containing naturally occurring functional groups are of particular interest to reduce cost and maintain simplicity. For example, hydroxyl functional containing oils such as *Physaria fendleri* (*Physaria*) oil with *Physaria* uerolic acid (C20:1OH) are valuable alternatives to petroleum-based and other natural oils that require several synthetic steps prior to incorporation into PU formulations. *Physaria* and castor oil possess similar chemical structures due to the $\beta$, $\gamma$-unsaturated hydroxyl functional group on a hydrocarbon chain; however, the hydroxyl functionality of castor oil is on average three compared to two for *Physaria* oil (Thames et al., *ACS Symp. Ser.* 575:212-222 (1994)). Castor oil also is mainly grown and processed in India and the oil is imported to the United States (U.S.), whereas *Physaria* is grown in the southwest region of the U.S. which could be an important economic factor in commercial use (Brahim et al., *Industrial Crops and Products* 5:245-252 (1996)).

Previous research modified the hydroxyl groups of *Physaria* oil through transesterification, dehydration, methacrylation, and acrylation (Thames et al., *ACS Symp. Ser.* 575: 212-22 (1994); Thames et al., *J. Appl. Polym. Sci.* 58(5): 943-50 (1995); Thames et al., *Ind. Crops Prod.* 6(2):169-175 (1997); Thames et al., *Prog. Org. Coat.*, 28(4):299-305 (1996)). These chemical modifications of the oil enabled formulations that targeted industrial coatings such as air-dry primers and ultraviolet-cured coatings. *Physaria* oil was hypothesized to introduce hydrophobicity and flexibility to industrial coatings due to the hydrophobic side chain. To provide adequate performance, each study required fillers and additives that were not designed nor approved for direct food contact applications.

In Thames et al., "Application of *Lesquerella* Oil in Industrial Coatings," *ACS Symp. Ser.* 575:212-22 (1994), *Physaria* oil was used in the synthesis of alkyd resins. The *Physaria* oil was first reacted through a monoglyceride process, cleaving two of the fatty acid chains off of the triglyceride to form a monoglyceride. The monoglyceride was then reacted with phthalic anhydride to form the alkyd polymer. In Thames et al., "Dehydration of *Lesquerella* Oil," *J. Appl. Polym. Sci.* 58(5):943-50 (1995), the triglycerides of *Physaria* oil were dehydrated to various extents using a variety of catalysts. This dehydration reaction removes the hydroxyl groups present in the triglyceride of the *Physaria* oil and forms a double bond. These dehydrated variants of *Physaria* oil were identified as drying oils. These dehydrated *Physaria* oils were used in later work by Thames in the formation of polyesters, again through the monoglyceride method (Thames, et al., "Air-Dry Primer Coatings From Dehydrated *Lesquerella* Oil," *Ind. Crops Prod.* 6(2):169-175 (1997)). In a further paper by Thames, the *Physaria* oil was again chemically modified, this time through acrylation of the hydroxyl groups present in the triglycerides (Thames, et al., "Acrylated *Lesquerella* Oil in Ultraviolet Cured Coatings," *Prog. Org. Coat.*, 28(4):299-305 (1996)). The modified *Physaria* oil triglycerides were then used in UV cured coatings. Id. All of these examples of the use of *Physaria* oil in polymers share the commonality of chemical modification of the triglycerides before polymerization.

The present application is directed to overcoming these and other deficiencies in the art.

SUMMARY

One aspect of the present application relates to a polyurethane polymer produced by polymerizing a reactant mixture including triglycerides of *Physaria fendleri*, one or more polyisocyanates, and one or more polyols, where the triglycerides of *Physaria fendleri* have a hydroxyl value ranging from 90 milligrams of potassium hydroxide per gram of the triglycerides of *Physaria fendleri* to 250 milligrams of potassium hydroxide per gram of the triglycerides of *Physaria fendleri*.

A second aspect of the present application relates to a method of forming a polyurethane. The method includes dissolving a polyol and triglycerides of *Physaria fendleri* in a first solvent to form a first solution, where the triglycerides of *Physaria fendleri* have a hydroxyl value ranging from 90 milligrams of potassium hydroxide per gram of the triglycerides of *Physaria fendleri* to 250 milligrams of potassium hydroxide per gram of the triglycerides of *Physaria fendleri*. This is followed by dissolving an isocyanate in a second solvent to form a second solution. The first and second solutions are then contacted to form a mixture under conditions effective to form a polyurethane polymer.

Another aspect of the present application relates to a polyester polymer produced by polymerizing a reactant mixture including triglycerides of *Euphorbia lagascae*, and one or more dicarboxylic acids.

A final aspect of the present application relates to a method of forming a polyester. The method includes mixing triglycerides of *Euphorbia lagascae* with a dicarboxylic acid in a solvent to form a solution. This is followed by reacting the solution under conditions effective to form a polyester polymer.

Polyurethanes (PU) have been used in various applications for decades, such as foams, plastics, composites, films, sealants, coatings, inks, and adhesives. With increased global interest in sustainable and environmentally benign packaging, there is high demand to replace common petroleum-based materials with bio-derived sources. This application discloses PU adhesives for multilayer flexible food packaging using plant oil extracts. Due to their abundance and renewability, vegetable and plant oil extracts are desirable as chemical feedstocks in PU adhesive synthesis. Traditionally, vegetable and plant oils used in bio-based polyurethanes required chemical modification to introduce hydroxyl groups for PU synthesis. Thus, oils not requiring chemical modifications are advantageous to reduce cost and increase simplicity. Two oils containing different equivalents of hydroxyl functional fatty acids (f~2 *Physaria fendleri* oil; f~3 *Ricinus communis*-castor oil) were systematically varied in PU adhesive formulations to understand the influence of a C18 side chain on physical properties. Peel resistance of polyethylene and polyethylene terephthalate substrates adhered with adhesives containing varying amounts of *Physaria* and castor oils determined average peel strengths of 6-8 N. The results of this study determined that bio-derived PU adhesive formulations possessed glass transition temperatures with a range of −25 to −44° C. and increased peel strength compared to other bio-based modified resins. Understanding the PU adhesive network structure-property relationships will help develop the next generation of bio-derived PU adhesives with additional sources of renewable feedstocks for food packaging applications.

Plant-based PU adhesives comprised of unmodified *Physaria* and castor oils were formulated for use as the adhesive in multilayer food packaging applications. The influence of the C18 side chain on the physical properties were studied by systematically varying castor oil (no C18 side chain, OH f~3) and *Physaria* oil (contains C18 side chain, OH f~2) content maintaining the total equivalents of trifunctional molecules (Polyhexamethylene diisocyanate and castor oil) to minimize crosslink density differences between formulations. It was hypothesized that the hydrocarbon side chain of *Physaria* oil will produce formulations with decreased glass transition temperature and increase adhesion between hydrophobic substrates.

Similar to the polyurethanes mentioned above, polyester polymers are widely used in many industrial and consumer applications including, foams, plastics, composites, films, sealants, coatings, inks, fibers and adhesives. Indeed, there is a strong global drive to find sustainable alternatives to traditional petroleum based polyester feedstocks for such applications. Others have focused on chemical modifications of vegetable oils to introduce epoxy functional groups such as epoxidized soybean oil. This application discloses the use triglycerides of *Euphorbia Lagascae* which inherently possess an average of two epoxy containing fatty acids (e.g., vernolic acid). Such intrinsic functionality avoids the requirement of chemical modification of the triglyceride to polymerize with molecules containing two or more chemical functional groups capable of reacting with epoxide groups (carboxylic acid, isocyanate, hydroxyl, anhydride, etc.). To demonstrate this, triglycerides of *Euphorbia lagascae* have been polymerized with dicarboxylic acids (sebacic acid, malic acid, adipic acid).

BRIEF DESCRIPTION OF THE DRAWINGS

FIG. 3 is a graphical schematic of the adhesive application and lamination apparatus used to manufacture peel strength samples.

FIGS. 6A-6C are the C-Laser differential interference contrast (DIC) images of the Castor-*Physaria* coated paper samples of Example 1. FIG. 6A is the Castor-*Physaria*-HDI, FIG. 6B is the Castor-*Physaria*-HMDI, and FIG. 6C is the Castor-*Physaria*-IPDI.

FIGS. 7A-7C are the C-Laser DIC images of the *Physaria* coated paper samples of Example 1. FIG. 7A is the *Physaria*-HDI coating, FIG. 7B is the *Physaria*-HMDI coating, and FIG. 7C is the *Physaria*-IPDI coating.

FIGS. 8A-8C are the contact angle droplet images and corresponding angle (in left hand corner) for the Castor-*Physaria* coatings of Example 1. FIG. 8A is the Castor-*Physaria*-HDI coating, FIG. 8B is the Castor-*Physaria*-HMDI coating, and FIG. 8C is the Castor-*Physaria*—IPDI coating.

FIGS. 9A-9C are the contact angle droplet images and corresponding angle (in left hand corner) for the *Physaria* coatings of Example 1. FIG. 9A is the *Physaria*-HDI coating, FIG. 9B is the *Physaria*-HMDI coating, and FIG. 9C is the *Physaria*-IPDI coating.

DETAILED DESCRIPTION

Figure 1:
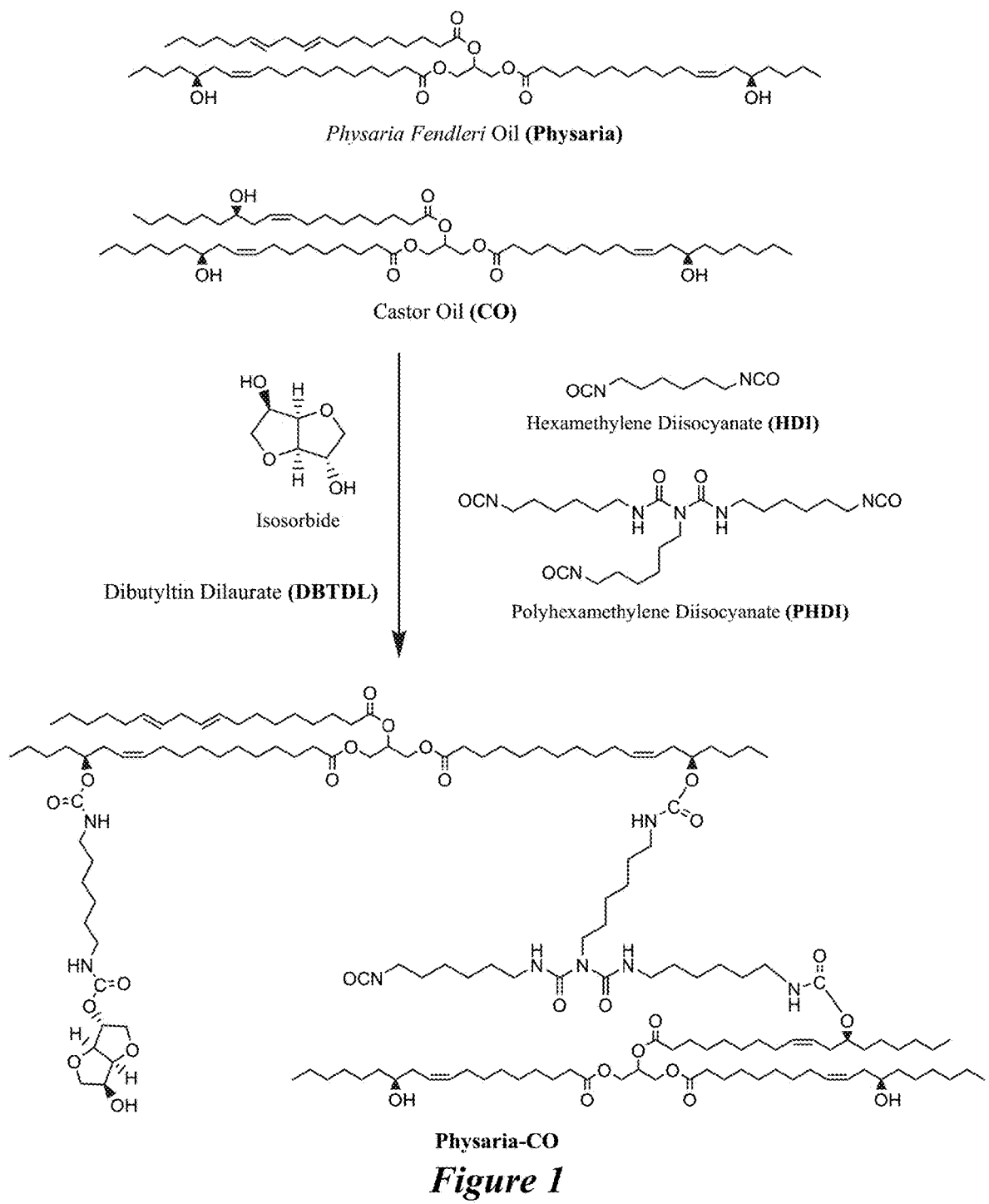
FIG. 1 is the reaction scheme depiction of the polymerization of *Physaria* oil with isosorbide and diisocyanates in the formation of a polyurethane.

One aspect of the present application relates to a polyurethane polymer produced by polymerizing a reactant mixture including triglycerides of *Physaria fendleri*, one or more polyisocyanates, and one or more polyols., where the triglycerides of *Physaria fendleri* have a hydroxyl value ranging from 90 milligrams of potassium hydroxide per gram of the triglycerides of *Physaria fendleri* to 250 milligrams of potassium hydroxide per gram of the triglycerides of *Physaria fendleri*.

In U.S. Provisional Patent Application Ser. No. 62/991, 167, filed Mar. 18, 2020, to which the present application claims priority, the term *Lesquerella fendleri* (abbreviated LesQ in that provisional application) was used as the scientific name for what is now referred to as *Physaria fendleri*. This change in nomenclature was necessitated as the *Physaria* genus of plants were formerly called *Lesquerella*. Both *Lesquerella fendleri* and *Physaria fendleri* are understood to refer to the same plant.

As used above, and throughout the description herein, the following terms, unless otherwise indicated, shall be understood to have the following meanings. If not defined otherwise herein, all technical and scientific terms used herein have the same meaning as is commonly understood by one of ordinary skill in the art to which this technology belongs. In the event that there is a plurality of definitions for a term in the present application, those in this section prevail unless stated otherwise.

As discussed above, the prior art discloses the chemical modification of the triglycerides of *Physaria fendleri* for the formation of polymers. In the present application, the triglycerides of *Physaria fendleri* are triglycerides that have not been chemically modified, such as through dehydration, acrylation, or through a monoglyceride process. The triglycerides of *Physaria fendleri* will have a hydroxyl value ranging from 90 milligrams of potassium hydroxide per gram of the triglycerides of *Physaria fendleri* to 250 milligrams of potassium hydroxide per gram of the triglycerides of *Physaria fendleri*. For example, the triglycerides of *Physaria fendleri* can have a hydroxyl content ranging from about 90 mg of potassium hydroxide per gram of the triglycerides of *Physaria fendleri*, 110 mg of potassium hydroxide per gram of the triglycerides of *Physaria fendleri*, 130 mg of potassium hydroxide per gram of the triglycerides of *Physaria fendleri*, 150 mg of potassium hydroxide per gram of the triglycerides of *Physaria fendleri*, 170 mg of potassium hydroxide per gram of the triglycerides of *Physaria fendleri*, 190 mg of potassium hydroxide per gram of the triglycerides of *Physaria fendleri*, 210 mg of potassium hydroxide per gram of the triglycerides of *Physaria fendleri*, 230 mg of potassium hydroxide per gram of the triglycerides of *Physaria fendleri*, up to 250 mg of potassium hydroxide per gram of the triglycerides of *Physaria fendleri*. In general, the hydroxyl value is a measure of the content of free hydroxyl groups in a chemical substance. It is based on the number of milligrams of potassium hydroxide required to neutralize the acetic acid taken up on acetylation of one gram of a chemical containing hydroxyl groups. The number of hydroxyl groups present on the triglycerides of *Physaria fendleri* allow for the formation of a linear polymer. This is because the hydroxyl groups of molecules with two functional groups act as chain extenders, rather than crosslinkers. Molecules with greater than two functional groups, such as castor oil, create crosslinks in the final molecular structure.

The term "copolymer" refers to a polymer derived from more than one species of monomer.

The term "random copolymer" or "random polymer" refers to a copolymer in which there is no definite order for the sequence of the different building blocks (-M1M2M1M1M2M1M2M2-, wherein M1 and M2 represent different monomers)

The term "block copolymer" or "block polymer" refers to a macromolecule consisting of long sequences of different repeat units. Exemplary block polymers include, but are not limited to AnBm, AnBmAm, AnBmCk, or AnBmCkAn, wherein A, B, and C represent the different monomers, and n, m, and k are the number of monomers present in each block.

The term "cure" as used herein refers to exposing to radiation in any form, heating, or allowing to undergo a physical or chemical reaction that results in hardening or an increase in viscosity.

The term "volatile organic compound" means materials having organic chemicals that have a high vapor pressure at ordinary, room-temperature conditions. Their high vapor pressure results from a low boiling point, which causes large numbers of molecules to evaporate from the liquid or solid form of the compound and enter the surrounding air. An example is formaldehyde, with a boiling point of −19° C. (−2° F.), slowly exiting paint and getting into the air. The term "zero VOC" means a material having zero detectable VOC's using standard detection equipment.

The term "alkyl" means an aliphatic hydrocarbon group which may be straight or branched. When not otherwise restricted, the term refers to an alkyl of 20 or fewer carbons. Branched means that one or more lower alkyl groups such as methyl, ethyl, or propyl are attached to a linear alkyl chain. Exemplary alkyl groups include methyl, ethyl, n-propyl, i-propyl, n-butyl, t-butyl, n-pentyl, 3-pentyl, and the like.

The term "aryl" means an aromatic monocyclic or multicyclic (polycyclic) ring system of 6 to about 19 carbon atoms, or of 6 to about 10 carbon atoms, and includes arylalkyl groups. The ring system of the aryl group may be optionally substituted. Representative aryl groups include, but are not limited to, groups such as phenyl, naphthyl, azulenyl, phenanthrenyl, anthracenyl, fluorenyl, pyrenyl, triphenylenyl, chrysenyl, and naphthacenyl.

"Unsubstituted" atoms bear all of the hydrogen atoms dictated by their valency.

The term "optionally substituted" is used to indicate that a group may have a substituent at each substitutable atom of the group (including more than one substituent on a single atom), provided that the designated atom's normal valency is not exceeded and the identity of each substituent is independent of the others. Up to three H atoms in each residue are replaced with alkyl, halogen, haloalkyl, hydroxy, lower alkoxy, carboxy, carboalkoxy (also referred to as alkoxycarbonyl), carboxamido (also referred to as alkylaminocarbonyl), cyano, carbonyl, nitro, amino, alkylamino, dialkylamino, mercapto, alkylthio, sulfoxide, sulfone, acylamino, amidino, phenyl, benzyl, heteroaryl, phenoxy, benzyloxy, or heteroaryloxy. When a substituent is keto (i.e., =O), then two hydrogens on the atom are replaced. Combinations of substituents and/or variables are permissible only if such combinations result in stable compounds. A "stable compound" is meant to be a compound that is sufficiently robust to survive isolation to a useful degree of purity from a reaction mixture, and formulation into an efficacious therapeutic agent.

The preparation of *polymers from* renewable sources is of significant economic and scientific importance. As an inexpensive, readily available renewable resource, attention has been paid to renewable resources such as vegetable oils which are abundant and varied as a source for polymeric materials. Since they are composed of triglycerides containing predominantly unsaturated fatty acids, native North American vegetable oils are chemically relatively unreactive other than for drying reactions. But other functional groups such as hydroxyl, epoxy, or carboxyl groups can be introduced at the positions of double bonds (Petrovic, et al., *J Polymer Sci A Polym. Chem* 38:4602 (2000), which is hereby incorporated by reference in its entirety) to produce reactive raw materials, which have been utilized in producing valuable polymeric materials. However, these chemical modifications require excess process steps and add further costs to the resulting polymer.

Vegetable oils are predominantly made up of triacylglycerol (also called triglycerides) molecules and have complex structures (O'Brien, R. D., *Fats and Oils: Formulating and Processing for Applications*, CRC press, Boca Raton, Florida 16-17 (2004), which is hereby incorporated by reference in its entirety). Triglyceride molecules are constituted by three fatty acids (varying from 14 to 22 carbons each in length for North American seed oils) and connected to a glycerol backbone through ester linkages. The fatty acids constituting most common North American seed oils have 0 to 3 double bonds which have provided the sites of reactivity to convert the triacylglycerol structure of the vegetable oil into a triacylglycerol polyol, the raw material suitable for polymer production.

*Physaria fendleri* is a desert shrub native to the American Southwest. Three hydroxy fatty acids (lesquerolic, densipolic, and auricolic acids, shown below) have been identified as the primary fatty acids of the triglycerides in the seed oils of *Physaria* species (Thames, et al., "Application of *Lesquerella* Oil in Industrial Coatings," *ACS Symp. Ser.* 575:212-22 (1994), which is hereby incorporated by reference in its entirety). It is normal for one acid to predominate over the other two within a species; however, all are similar to ricinoleic acid, the primary fatty acid of castor oil. Id.

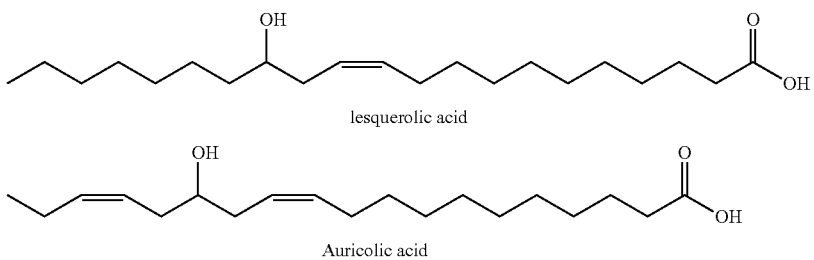

lesquerolic acid

Auricolic acid

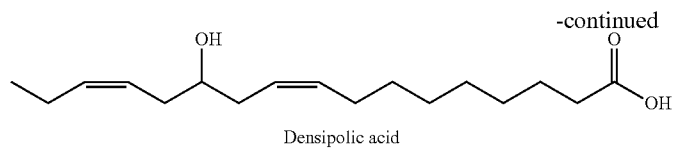
Densipolic acid

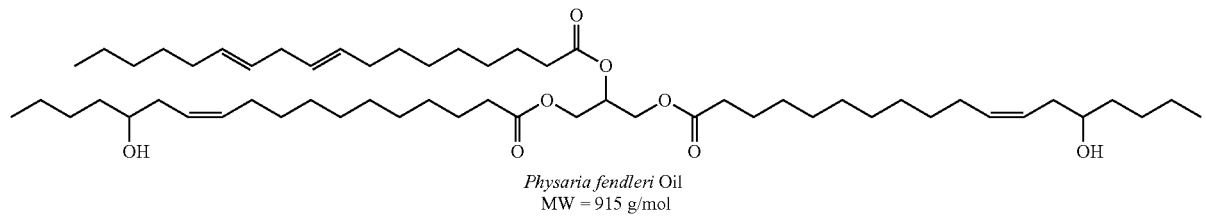
*Physaria fendleri* Oil
MW = 915 g/mol

Some triglyceride oils such as castor oil have hydroxyl groups which can act as reaction sites which enables them to be processed into high-value biochemicals for various industries (Pryde, et al., (Eds.), *New Sources of Fats and Oils*, American Oil Chemists Society, Champaign, Ill., (1981), which is hereby incorporated by reference in its entirety). Castor is a minor oilseed crop. Approximately 50% of the seed weight is oil (triacylglycerol) in which 85-90% of total fatty acids are the hydroxylated fatty acid, ricinoleic acid (shown below).

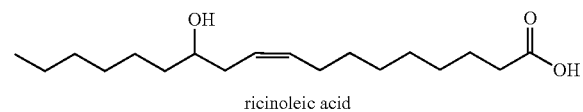 [SMILES: CCCCCCC(O)C/C=C\CCCCCCCC(=O)O]
ricinoleic acid

In a further embodiment of the present application, the polyurethane polymer is produced from a reaction mixture further including triglycerides of castor oil. Additionally, the polyurethane polymer can be produced from a reaction mixture further including triglycerides with at least two naturally containing hydroxyl functional fatty acids. In another embodiment of the present application, the polyurethane polymer can be produced from a reaction mixture including triglycerides of *Euphorbia lagascae*. The reaction mixture for the formation of the polyurethane polymer of the present application can further include a polymer formed from triglycerides of *Euphorbia lagascae* and one or more dicarboxylic acids.

cation, polyisocyanates are reacted with unmodified *Physaria fendleri* oil (*Physaria* oil) and unmodified castor oil to form polyurethane polymers. An exemplary reaction scheme of this reaction can be seen in FIG. 1.

In the preparation of the polyurethane polymer of the present application. polyisocyanates, for example, diisocyanate such as alicyclic diisocyanate, aliphatic diisocyanate, aralkyl diisocyanate, and aromatic diisocyanate may be used, as long as the properties of the polyurethane resin of the present application are not impaired.

Examples of the alicyclic diisocyanate include 1,3-cyclopentane diisocyanate, 1,4-cyclohexane diisocyanate, 1,3-cyclohexane diisocyanate, 3-isocyanatomethyl-3,5,5-trimethyl cyclohexyl isocyanate (also known as isophorone diisocyanate), 4,4'-methylene-bis(cyclohexyl isocyanate), methyl-2,4-cyclohexane diisocyanate, methyl-2,6-cyclohexane diisocyanate, 1,3-bis(isocyanatomethyl)cyclohexane, 1,3-bis(isocyanatoethyl)cyclohexane, 1,4-bis(isocyanatoethyl)cyclohexane, and 2,5- or 2,6-bis(isocyanatomethyl)norbornane (NBDI) and mixtures thereof.

Examples of the aliphatic diisocyanate include trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, 2,4,4- or 2,2,4-trimethyl hexamethylene diisocyanate, and 2,6-diisocyanato methyl caproate.

Examples of the aralkyl diisocyanate include 1,3- or 1,4-xylylene diisocyanate or mixtures thereof, 1,3- or 1,4-

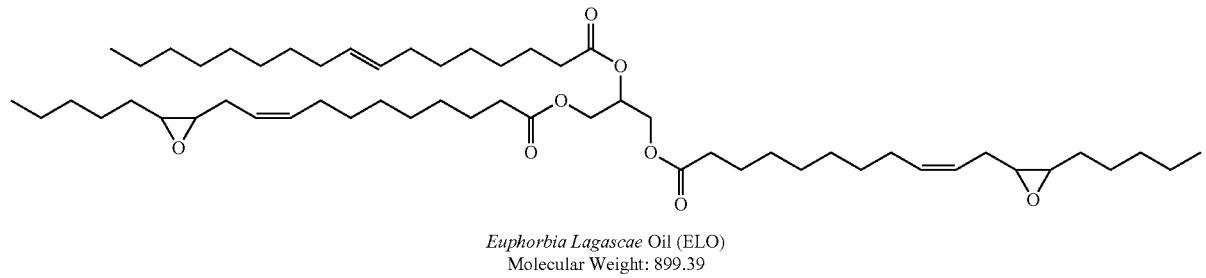 [SMILES: CCCCCCCC/C=C/CCCCCCC(=O)OC(COC(=O)CCCCCCC/C=C\CC1OC1CCCCC)COC(=O)CCCCCCC/C=C\CC1OC1CCCCC]
*Euphorbia Lagascae* Oil (ELO)
Molecular Weight: 899.39

Polyurethane resins are usually produced by a reaction between a polyisocyanate component and a polyol component, and are widely used in various fields of industry, for example, as elastomers, lenses, synthetic leather, slush powders, elastic molded articles, RIM molded articles, paints, adhesives, sealing materials, or foams. In the present applitetramethylxylylene diisocyanate or mixtures thereof, and ω,ω'-diisocyanato-1,4-diethylbenzene.

Examples of the aromatic diisocyanate include 2,4-tolylene diisocyanate and 2,6-tolylene diisocyanate, and isomeric mixtures of these tolylene diisocyanates; 4,4'-diphenylmethane diisocyanate, 2,4'-diphenylmethane diisocyanate, and 2,2'-diphenylmethane diisocyanate, and any isomeric mixtures of these diphenylmethane diisocyanates; toluoylene diisocyanate, paraphenylene diisocyanate, and naphthalene diisocyanate.

Derivatives of these diisocyanates may be used in combination. More specifically, a multimer of these diisocyanates (dimers or trimers (e.g., isocyanurate-modified products)) may also be used in combination.

In one embodiment of the polyurethane polymer of the present application, the polyisocyanate is selected from the group including hexamethylene diisocyanate, poly(hexamethylene diisocyanate), dicyclohexylmethane 4,4'-diisocyanate, isophorone diisocyanate, 4,4'-diphenylmethane diisocyanate, toluene diisocyanate, ethylene diisocyanate, and paraphenyl diisocyanate.

In a further embodiment of the polyurethane polymer of the present application, the triglycerides of *Physaria fendleri* to the polyisocyanate are in a molar ratio ranging from 1:0.5 to 1:1.5.

Isosorbide is a hydroxyl functional renewable molecule that can be incorporated into polyurethane coatings and adhesives. Isosorbide has two secondary hydroxyls; it is known to increase material rigidity due to its dicyclic ring structure and have a high degree of thermal stability, which is needed in coatings and adhesives for food packaging. Isosorbide is also biodegradable, non-toxic, non-mutagenic, and soluble in water which makes it an attractive material to be used in the PU formulation (Javni et al., "Thermoplastic Polyurethanes with Isosorbide Chain Extender," *Journal of Applied Polymer Science* 132(47):42830 (2015), which is hereby incorporated by reference in its entirety).

Other suitable polyols that are useful in the formation of the polyurethane polymers of the present application include, but are not limited to, ethylene glycol, propylene glycol, dipropylene glycol, 1,2,4-butanetriol, 1,7-heptanediol, glycerol, panaxatriol, panaxytriol, balsaminol B, momordol, erythritol, enterodiol, xylitol, miglitol, sorbitol, mannitol, galactitol, isomalt, and maltitol. Suitable polyols can also include saccharides such as aldohexose, aldopentose, aldotetrose, aldotriose, aldose, allose, altrose, arabinose, amylopectin, amylose, dextrose, erythrose, fructose, galactose, glucose, gulose, hexose, idose, ketohexose, ketose, lactose, lyxose, maltose, mannose, pentose, ribose, saccharose, sucrose, talose, tetrose, triose, xylose, as well as their respective stereoisomers.

In a further embodiment of the present application the polyol is selected from the group consisting of polycaprolactone diol, poly(tetrahydrofuran), isosorbide, ethylene glycol, polyethylene glycol, propylene glycol, butylene glycol, polyethylene oxide, glycerol, and sugar alcohols. The diols may be polymers of differing molecular weights, or contain a mixture of molecular weights.

In another embodiment of the present application, the polyurethane polymer includes triglycerides of *Physaria fendleri* to polyols in a molar ratio ranging from 4.5:1 to 0.01:1.

The molecular weight of the polyurethane polymer of the present application depends on the final intended use of the polymer. The polyurethane polymer may be fully crosslinked and thermoset with a high molecular weight, alternatively, the polymer may have a lower molecular weight, i.e., pre curing. In a further embodiment of the present application, the polyurethane polymer has a number average molecular weight ranging from 3000 grams per mole of polyurethane polymer to 1,000,000 grams per mole of the polyurethane polymer. Furthermore, the polyurethane polymer may have a glass transition point ranging from −50° C. to 110° C.

A second aspect of the present application relates to a method of forming a polyurethane. The method includes dissolving a polyol and triglycerides of *Physaria fendleri* in a first solvent to form a first solution, where the triglycerides of *Physaria fendleri* have a hydroxyl value ranging from 90 milligrams of potassium hydroxide per gram of the triglycerides of *Physaria fendleri* to 250 milligrams of potassium hydroxide per gram of the triglycerides of *Physaria fendleri*. This is followed by dissolving an isocyanate in a second solvent to form a second solution. The first and second solutions are then contacted to form a mixture under conditions effective to form a polyurethane polymer. The contacting can be carried out at a temperature between about 20° C. to about 180° C. Additionally, the contacting may be carried out in the presence of a catalyst suitable to permit formation of the polyurethane.

In a further embodiment of the method of forming a polyurethane polymer of the present application, the catalyst is selected from the group including dibutyltin dilaurate, triethylamine, triethylenediamine, N-methylmorpholine, tetramethyltin, tetraoctyltin, dimethyldioctyltin, and triethyltin chloride.

In another embodiment of the method of forming a polyurethane polymer of the present application, the method further allows for including castor oil in the first solution prior to said contacting of the first and second solutions. The method may also include removing solvent from the mixture after formation of the polyurethane, and curing the polyurethane at a temperature between about 20° C. and 80° C.

In yet a further embodiment of the method of forming a polyurethane polymer of present application, the resultant polymer can have all of the properties described supra.

Additional methods for the formation of polyurethane polymers that may be suitable for use in the present application are disclosed in U.S. Pat. No. 8,722,752 to Kuwamura et al.; U.S. Pat. No. 4,826,944 to Hoefer et al.; U.S. Pat. No. 4,742,087 to Kluth et al.; U.S. Pat. No. 2,833,730 to Barthel; and U.S. Pat. No. 8,492,433 to Selifonov, all of which are hereby incorporated by reference in their entirety.

Polyesters are another type of polymer which can be formed in the present application. Polyesters have been used as materials for containers of various beverages such as juice, soft drinks and carbonated beverages and also materials of films, sheets and fibers.

Figure 2:
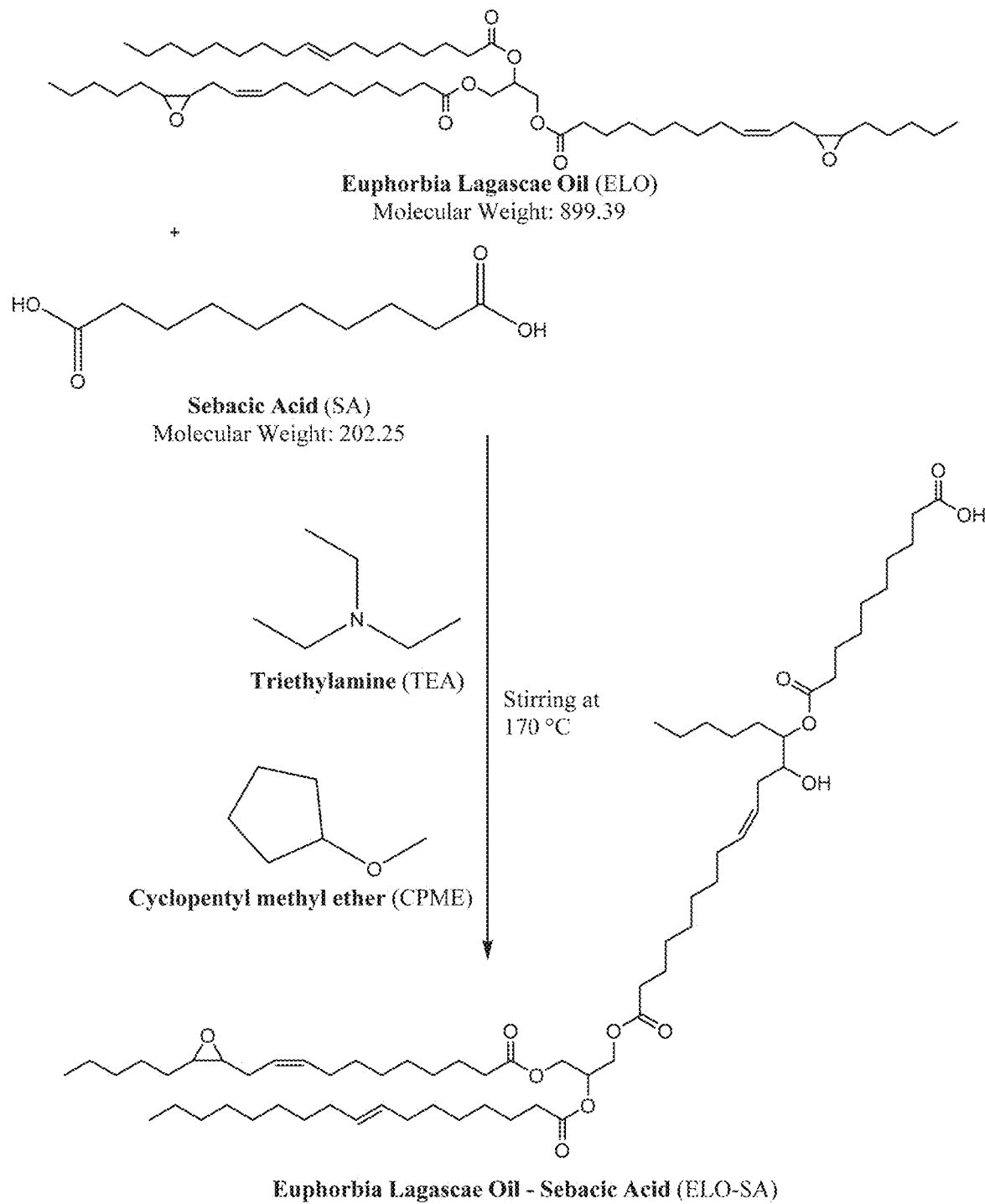
FIG. 2 is the reaction scheme depiction of the polymerization of *Euphorbia Lagascae* oil with sebacic acid in the presence of catalyst or solvent at 170° C.

The polyesters can generally be produced using starting materials including dicarboxylic acids such as aromatic dicarboxylic acids and diols such as aliphatic diols. Polyesters can also be formed from the reaction of dicarboxylic acids and epoxides. In this application, a dicarboxylic acid is reacted with an epoxy fatty acid of a triglyceride in the formation of polyesters. FIG. 2 shows the proposed epoxycarboxyl reaction.

Another aspect of the present application relates to a polyester polymer produced by polymerizing a reactant mixture including triglycerides of *Euphorbia lagascae*, and one or more dicarboxylic acids.

The chemical structure of the *Euphorbia lagascae* oil (ELO) is a triglyceride with epoxy groups present on its fatty acid carbon chains, see above. *Euphorbia lagascae* oil contains very high levels of the epoxy fatty acid vernolic acid in its seed oil. Vernolic acid (shown below) is a C18 fatty acid that is structurally distinct from other plant fatty acids in its possession of an epoxy group between its $\Delta^{12}$ and $\Delta^{13}$ carbon atoms (Cahoon et al., "Transgenic Production of Epoxy Fatty Acids by Expression of a Cytochrome P450 Enzyme from *Euphorbia lagascae* Seed," *Plant Physiology* 128:615-624 (2002), which is hereby incorporated by reference in its entirety). This fatty acid is enriched in the seed oils of several Asteraceae genera, including *Stokesia*, *Vernonia*, and *Crepis*. Id. Euphorbiaceae species such as *Euphorbia lagascae* and Bernardia *pulchella* can contain vernolic acid contents ranging from 50% to 90% (w/w) of the total fatty acids. Id. Vegetable oils that contain vernolic acid have a number of potential industrial applications due to the unique chemical properties associated with the Δ 12-epoxy group. Id. Vernolic acid-enriched seed oils, can be used as plasticizers of polyvinyl chloride, a market that is currently served by petroleum-derived compounds such as phthalates and to a lesser extent by chemically epoxidized soybean and linseed oil. Id. It is the ability of the epoxy group to crosslink that makes vernolic acid useful in adhesives and coating materials such as paint. Id.

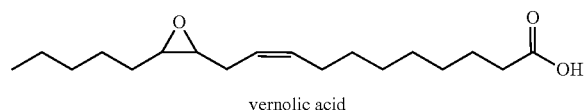 [SMILES: CCCCCC1OC1C/C=C\CCCCCCCC(=O)O]

vernolic acid

The epoxidized triglycerides can be polymerized and crosslinked via ring opening polymerization by a large number of epoxy reactive molecules including, but not limited to, diamines, anhydrides, diols, dicarboxylic acids and they can be hydrolyzed in acidic medium to a polyol and can polymerize by ring opening polymerization by the use of suitable initiators. Diamines that may be beneficially used include, but are not limited to, methylene dicyclohexyl amine, triethylene tetraamine, p-diaminobenzene, methylene dianiline, trimethyl hexamethylene diamine, diethanolamine, propanediamine, isophorone diamine diaminodiphenyl sulfone, etc. Diols that can be beneficially used include, but are not limited to, ethylene glycol, 2,5-hexanediol, 1,4-butanediol, pentaerythritol, bisphenol-A, 1,6-hexanediol, hydroquinone, sorbitol, inisitol, etc. Anhydrides that can be beneficially used include, but are not limited to, maleic anhydride, phthalic anhydride, pyromellitic dianhydride, nadic anhydride, succinic anhydride, cyclohexanedicarboxylic anhydride, etc. Alkoxides, hydroxides and Lewis acids that can be used include, but are not limited to, sodium and potassium hydroxide, methoxide, isopropoxide, aluminum trichloride and boron trifluoride. Acidic reagents that can be used include, but are not limited to, sulfuric, hydrochloric and hydrobromic acids., etc.

Suitable dicarboxylic acids useful for the formation of the polyester polymers of the present application include aliphatic dicarboxylic acid such as oxalic acid, succinic acid, adipic acid, or sebasic acid. Other types of dicarboxcylic acids may also be used in the polyester of the present application including alicyclic dicarboxylic acids such as cyclobutanedicarboxylic acid, hexahydroterephthalic acid or hexahydroisophthalic acid; aromatic dicarboxylic acids such as phthalic acid, isophthalic acid, terephthalic acid, methylterephthalic acid, naphthalene-2,6-dicarboxylic acid or naphthalene-2,7-dicarboxylic acid; carboxylic acids such as diphenylether dicarboxylic acid, diphenyl sulfonedicarboxylic acid, diphenoxyethanedicarboxylic acid, or sodium 3.-5-dicarboxybenzenesulfonate, and hydroxycarboxylic acids such as glycolic acid, p-hydroxybenzoic acid or p-B-hydroxyethoxybenzoic acid.

In one embodiment of the polyester polymer of the present application, the dicarboxylic acid is selected from the group consisting of sebacic acid, oxalic acid, succinic acid, adipic acid, cyclobutanedicarboxylic acid, hexahydroterephthalic acid, hexahydroisophthalic acid, phthalic acid, isophthalic acid, terephthalic acid, methylterephthalic acid, naphthalene-2,6-dicarboxylic acid, naphthalene-2,7-dicarboxylic acid, diphenylether dicarboxylic acid, diphenyl sulfonedicarboxylic acid, diphenoxyethanedicarboxylic acid, sodium 3-5-dicarboxybenzenesulfonate, glycolic acid, p-hydroxybenzoic acid and p-B-hydroxyethoxybenzoic acid.

In another embodiment of the polyester polymer of the present application, the triglycerides of *Euphorbia lagascae* to the dicarboxylic acid are in a molar ratio ranging from 0.5:1 to 2:1.

The molecular weight of the polyester polymer of the present application can be fine-tuned based on the intended use of the polymer. In a further embodiment of the present application, the polyester polymer has a number average molecular weight ranging from 3000 grams per mole of the polyester polymer to 1,000,000 grams per mole of the polyester polymer. Furthermore, the polyester polymer may have a glass transition point ranging from –50° C. to 110° C.

A final aspect of the present application relates to a method of forming a polyester. The method includes mixing triglycerides of *Euphorbia lagascae* with a dicarboxylic acid in a solvent to form a solution. This is followed by reacting the solution under conditions effective to form a polyester polymer.

The reaction can be carried out at a temperature between about 20° C. to about 180° C. Additionally, the contacting may be carried out in the presence of a catalyst suitable to permit formation of the polyester. The method of forming the polyester may also include removing solvent from the mixture after formation of the polyester.

In a further embodiment of the method of forming a polyurethane polymer of the present application, the catalyst is selected from the group including triethylamine, triethylenediamine, antimony trioxide, tetrabutyl titanate(IV), titanium(IV) isopropoxide, tin(II) 2-ethylhexanoate, and dibutyltin(IV) oxide.

In yet a further embodiment of the method of forming a polyester polymer of the present application, the resultant polymer can have all of the properties described supra.

Additional methods for the formation of polyester polymers that are suitable for use in the present application are disclosed in U.S. Pat. No. 5,179,143 to Konig et al.; U.S. Pat. No. 4,418,174 to Dhein et al.; U.S. Pat. No. 7,144,614 to Nakajima et al.; U.S. Pat. No. 5,925,710 to Wu et al.; U.S. Pat. Nos. 4,408,004 and 4,535,118 to Pengilly; and U.S. Pat. No. 6,121,398 to Wool et al., all of which are hereby incorporated by reference in their entirety.

In certain embodiments, the polymerization solutions of the present application may also comprise an initiator. Suitable initiators depend greatly on the details of the polymerization, including the types of monomers being used, the type of catalyst system, the solvent system, and the reaction conditions. Initiators generate an active center (e.g., a radical or cation) that can react with the monomers in the reaction mixture, thereby starting the polymerization process.

In some embodiments, the initiator may be a photoinitator, a thermal initiator, an ultraviolet initiator, or another type of initiator.

Photo initiators when irradiated with UV light, produce free radicals which initiate photopolymerization. The initiator may be, for example, 2-hydroxy-4'-(2-hydroxyethoxy)-2-methylpropiophenone, a benzoin ether, a benzil ketal, an a-dialkoxyacetophenone, an α-hydroxyphenone, an α-amino-alkylphenone, an acylphosphine oxide, a benzophenone/amine, a thioxanthone/amine, azobisisobutyronitrile, lithium phenyl-2,4,6-trimethylbenzoylphosphinate, or a combination thereof. Other examples of suitable photo initiators include acetophenone; anisoin; anthraquinone; anthraquinone-2-sulfonic acid, sodium salt monohydrate; tricarbonylchromium; benzil; benzoin, sublimed; benzoin ethyl ether; benzoin isobutyl ether; benzoin methyl ether; benzophenone; benzophenone/1-hydroxycyclohexyl phenylketone, 50/50 blend; 3,3',4,4'-benzophenonetetracarboxylic dianhydride; 4-benzoylbiphenyl; 2-benzyl-2-(dimethylamino)-4'-morpholinobutyrophenone; 4,4'-bis(diethylamino)benzophenone; 4,4'-bis(dimethylamino)benzophenone; camphorquinone; 2-chlorothioxanthen-9-one; (cumene)cyclopentadienyliron(II) hexafluorophosphate; dibenzosuberenone; 2,2-diethoxyacetophenone; 4,4'-dihydroxybenzophenone; 2,2-dimethoxy-2-phenylacetophenone; 4-(dimethylamino)benzophenone; 4,4'-dimethylbenzil; 2,5-dimethylbenzophenone; 3,4-dimethylbenzophenone; diphenyl(2,4,6-trimethylbenzoyl)phosphine oxide/2-hydroxy-2-methylpropiophenone, 50/50 blend; 4'-ethoxyacetophenone; 2-ethylanthraquinone; ferrocene; 3'-hydroxyacetophenone; 4'-hydroxyacetophenone; 3-hydroxybenzophenone; 4-hydroxybenzophenone; 1-hydroxycyclohexyl phenyl ketone; 2-hydroxy-2-methylpropiophenone; 2-methylbenzophenone; 3-methylbenzophenone; methybenzoylformate; 2-methyl-4'-(methylthio)-2-morpholinopropiophenone; phenanthrenequinone; 4'-phenoxyacetophenone; thioxanthen-9-one; triarylsulfonium hexafluoroantimonate salts, mixed, 50% in propylene carbonate; triarylsulfonium hexafluorophosphate salts, mixed, 50% in propylene carbonate, or a combination thereof.

Thermal radical initiators decompose upon heating into radical fragments which initiate polymerization. Exemplary thermal radical initiators include ammonium persulfate; sodium metabisulfite; benzoyl peroxide; di-t-amyl peroxide; t-butyl peroxy benzoate; di-cumyl peroxide; azobisisobutyronitrile (AIBN); 1,1' azobis(cyclohexanecarbonitrile) (ABCN); 4,4'-Azobis(4-cyanovaleric acid) (ACVA); 2,2'-azobis(2,4-dimethylpentanenitrile); and 2,2'-azobis(cyclohexanecarbonitdle).

The initiator in the polymerization solution can range from about 0.01 wt % to 10 wt %.

In certain embodiments, the polymerization solution may further comprise a cross-linking agent. The crosslinking agents interact with the reactive groups on the polyurethane or polyester polymer, whether part of the back bone or a pendent group. The crosslinking agents chemically bond together two polymer chains in the reaction mixture, thereby exponentially increasing the molecular weight of the polymer.

Suitable classes of cross-linkers are selected from the group consisting of isocyanates, anhydrides, multiply (meth) acrylated cross linkers, polyacids, and acid halides. The cross-linking agent may be, for example, poly(ethylene glycol)dimethacrylate, tetramethylethylenediamine, carboxybetaine diacrylamide cross-linker, carboxybetaine diacrylate, other bifunctional and multi-functional monomers and macromers, or a combination thereof.

The crosslinking agents may be diisocyanates. Exemplary diisocyanates suitable for the present application are disclosed supra. Other crosslinking agents that could interact with the residual reactive groups on the polyurethane polymer or polyester polymer of the present application include multiply (meth)acylated cross-linkers such as diethyleneglycol dimethacrylate (DEGDMA), diethylene glycol diacrylate, triethylene glycol dimethacrylate (TEGDMA), ethyleneglycol dimethacrylate (EGDMA), hexane-1,6-diol diacrylate (HDDA), ethylene glycol diacrylate, ethylene glycol dimethacrylate, poly(ethylene glycol) diacrylate, poly (ethylene glycol) dimethacrylate, tetra(ethylene glycol) diacrylate, or triethylene glycol dimethacrylate.

Furthermore, crosslinking agents such as poly acids, anhydrides, and acid halides may also be used. Exemplary cross linkers of these types include maleic acid, 2-methylmaleic acid, itaconic acid, 2-methylitaconic acid, α,β-methyleneglutaric acid, maleic anhydride, itaconic anhydride, acrylic anhydride, methacrylic anhydride, 1, 4-phenylenediacryloyl chloride, etc.

The concentration of the triglyceride monomers and the isocyanates and/or dicarboxylic acids used in any of the above described polymerization reactions depends partially on the solubility of the monomer and the polymer products as well as the evaporation temperature of the solvent. Solvent concentration can also affect the gelation of the polymer. Insufficient solvent can cause the polymer to crosslink in a shorter time period without reaching high enough conversions. The concentration of the monomer dissolved in the solvent in reactions may range from 1% to 100% weight percentage monomer. Typically, a monomer concentration of less than 90 wt % is suitable to ensure the solubility of the resulting polymers and additionally to prevent premature cross-linking and gelation.

Suitable solvents for use in the process of preparing the polyurethane and/or polyester polymers of the present application are selected based the requirements of the triglyceride monomers, isocyanate, and dicarboxylic acid solubility, as well as boiling point compatible with the type of polymerization being used, and the polymerization temperature. Exemplary solvents useful for the formation of the polymers described herein include, but are not limited to water, methanol, ethanol, methylene chloride, toluene, dioxane, THF, chloroform, cyclohexane, dimethyl sulfoxide, dimethyl formamide, acetone, acetonitrile, n-butanol, n-pentanol, chlorobenzene, diethylether, tert butanol, 1,2,-dichloroethylene, diisopropylether, ethanol, ethylacetate, ethylmethylketone, heptane, hexane, isopropylalcohol, iso-amylalcohol, methanol, pentane, n-propylalcohol, pentachloroethane, 1,1,2,2,-tetrachloroethane, 1,1,1,-trichloroethane, tetrachloroethylene, tetrachloromethane, trichloroethylene, water, xylene, benzene, nitromethane, glycerol, and mixtures thereof.

The solvent used in the polymerization reactions of the present application can further include stabilizers, surfactants, or dispersants. Suitable surfactants include ionic and nonionic surfactants such as alkyl polyglycol ethers such as ethoxylation products of lauryl, oleyl, and stearyl alcohols; alkyl phenol polyglycol ethers such as ethoxylation products of octyl- or nonylphenol, diisopropyl phenol, triisopropyl phenol; alkali metal ammonium salts of alkyl, aryl or alkylaryl sulfonates, sulfates, phosphates, and the like, including sodium lauryl sulfate, sodium octylphenol glycolether sulfate, sodium dodecylbenzene sulfonate, sodium lauryldiglycol sulfate, and ammonium tritertiarybutyl phenol and penta- and octa-glycol sulfonates, sulfosuccinate salts such as disodium ethoxylated nonylphenol half ester of sulfosuccinic acid, disodium n-octyldecyl sulfosuccinate, sodium dioctyl sulfosuccinate, and the like.

The polyurethane and polyester polymers of the present application can be copolymers, including a random or statistical copolymers, or block copolymers. Furthermore, the polyurethane and polyester polymers of the present application can be mixed together, and or formed from the copolymerization of the triglycerides, isocyanates and dicarboxylic acids, to form an epoxy-polyurethane polymer. This epoxy-polyurethane polymer may also be useful for the formation of adhesives and coatings.

The polyurethane and polyester polymers of the present application, as well as the epoxy-polyurethane polymers of the present application, may be used as adhesives.

In one embodiment of the present application, the adhesive composition includes the polyurethane and/or polyester polymers and a solvent.

Adhesive formulations may further include tackifiers and/or plasticizers. Suitable tackifiers include, but are not limited to, isosorbide-based tackifiers; Piccotac™1095 and Piccotac™8095 (Eastman Chemical Company, Kingsport, Tennessee); glycerol ester tackifiers, such as Staybelite™ Ester 10-E Ester of Hydrogenated Rosin and Staybelite™ Ester 3-E Ester of Hydrogenated Resin (Eastman Chemical Company, Kingsport, Tennessee); Floral™ AX-E Fully Hydrogenated Rosin (Eastman Chemical Company, Kingsport, Tennessee); phenolic resins; styrenated terpenes; polyterpenes; rosin esters; terpene phenolics; and monomeric resins.

Suitable plasticizers include, but are not limited to, benzoflex 2088 (DEGD); abietic acid; Eastman Triacetin™ and Eastman 168™ (Eastman Chemical Company, Kingsport, Tennessee); non-phthalate plasticizer; polyalkylene esthers, such as polyethylene glycol, polytetramethylene glycol, polypropylene glycol, and mixtures thereof; glyceryl monostearate; octyl epoxy soyate, epoxidized soybean oil, epoxy tallate, and epoxidized linseed oil; polyhydroxyalkanoate; glycols, such as thylene glycol, pentamethylene glycol, and hexamethylene glycol; anionic or cationic plasticizers, such as dioctyl sulfosuccinate, alkane sulfonate, and sulfonated fatty acid; phthalate or trimellitate plasticizers; polyethylene glycol di-(2-ethylhexoate); citrate esters; naphthenic oil and dioctyl phthalate; white oil; lauric, sebacic, or citric acids esters; nonfugitive polyoxyethylene aryl ether; copolymer of ethylene and carbon monoxide; photopolymerizable unsaturated liquid plasticizer; and sorbitol.

The adhesive compositions of the present application can further include an additive selected from the group consisting of inhibitors, initiators, and copolymers.

Both photo and thermal initiators can be used in the adhesive compositions of the present application to further polymerize or cure the polymers of the adhesive. Exemplary initiators are discussed supra. The initiator of the adhesive composition may be the same or different from the initiator used in the polyurethane polymer formation.

Inhibitors can be used to prevent further polymerization or crosslinking of the polymers of the present application in the adhesive compositions. Exemplary inhibitors include, but are not limited to, phenothiazine, hydroquinone, or antioxidant inhibitors such as the ETHANOX™ family (SI Group, Schenectady, NY) (e.g., ETHANOX 330™), IRGANOX (BASF, Florham Park, New Jersey) and STABOXOL (Rhein Chemie, Mannheim, Germany).

The adhesive compositions of the present application may include other monomers or polymers formed from the exemplary monomers, in addition to the polymers of the present application, to adjust the adhesive properties. The additional components include vinyl aromatic monomers such as styrene, α-methyl styrene, t-butyl styrene, vinyl xylene, vinyl naphthalene, vinyl pyridine, divinyl benzene, N-vinyl heteroaromatics (such as 4-vinylimidazole (Vim), N-vinylcarbazole (NVC), N-vinylpyrrolidone, etc.). Other exemplary vinyls include vinyl esters (such as vinyl acetate (VAc), vinyl butyrate (VB), vinyl benzoate (VBz)), N-vinyl amides and imides (such as N-vinylcaprolactam (NVCL), N-vinylpyrrolidone (NVP), N-vinylphthalimide (NVPI), etc.), vinylsulfonates (such as 1-butyl ethenesulfonate (BES), neopentyl ethenesulfonate (NES), etc.), vinylphosphonic acid (VPA), haloolefins (such as vinylidene fluoride (VF2)), etc. Exemplary methacrylates include C1-C6 (meth) acrylate (i.e., methyl methacrylate, ethyl methacrylate, propyl (meth)acrylate, butyl (meth)acrylate, isobutyl methacrylate, heptyl (meth)acrylate, or hexyl (meth)acrylate), 2-(acetoacetoxy)ethyl methacrylate (AAEMA), 2-aminoethyl methacrylate (hydrochloride) (AEMA), allyl methacrylate (AMA), cholesteryl methacrylate (CMA), t-butyldimethylsilyl methacrylate (BDSMA), (diethylene glycol monomethyl ether) methacrylate (DEGMA), 2-(dimethylamino)ethyl methacrylate (DMAEMA), (ethylene glycol monomethyl ether) methacrylate (EGMA), 2-hydroxyethyl methacrylate (HEMA), dodecyl methacrylate (LMA), methacryloyloxyethyl phosphorylcholine (MPC), (poly(ethylene glycol) monomethyl ether) methacrylate (PEGMA), pentafluorophenyl methacrylate (PFPMA), 2 (trimethylammonium)ethyl methacrylate (TMAEMA), 3-(trimethylamonium) propyl methacrylate (TMAPMA), triphenylmethyl methacrylate (TPMMA), etc. Other exemplary acrylates include 2-(acryloyloxy)ethyl phosphate (AEP), butyl acrylate (BA), 3-chloropropyl acrylate (CPA), dodecyl acrylate (DA), di(ethylene glycol) 2-ethylhexyl ether acrylate (DEHEA), 2-(dimethylamino)ethyl acrylate (DMAEA), ethyl acrylate (EA), ethyl a-acetoxyacrylate (EAA), ethoxyethyl acrylate (EEA), 2-ethylhexyl acrylate (EHA), isobornyl acrylate (iBoA), methyl acrylate (MA), propargyl acrylate (PA), (poly(ethylene glycol) monomethyl ether) acrylate (PEGA), tert-butyl acrylate (tBA), etc. Exemplary methacrylamides include N-(2-aminoethyl)methacrylamide (hydrochloride) (AEMAm) and N-(3-aminopropyl)methacrylamide (hydrochloride) (APMAm), N (2 (dimethylamino) ethyl)acrylamide (DEAPMAm), N-(3-(dimethylamino) propyl)methacrylamide (hydrochloride) (DMAPMAm), etc. Other exemplary acrylamides include acrylamide (Am) 2-acrylamido-2-methylpropanesulfonic acid sodium salt (AMPS), N-benzylacrylamide (BzAm), N-cyclohexylacrylamide (CHAm), diacetone acrylamide (N-(1,1-dimethyl-3-oxobutyl) acrylamide) (DAAm), N,N-diethylacrylamide (DEAm), N,N-dimethylacrylamide (DMAm), N (2 (dimethylamino)ethyl)acrylamide (DMAEAm), N-isopropylacrylamide (NIPAm), N octylacrylamide (OAm), etc. Exemplary nitriles include acrylonitrile, adiponitrile, methacrylonitrile, etc. Exemplary diolefins include butadiene, isoprene, etc.

In a further embodiment of the adhesives of the present application, the adhesive composition can also include a filler selected from the group consisting of ground mica, talc, kaolin clay, calcium carbonate, calcium sulfite, colloidal silica, wollastonite, ballotini, hollow glass microspheres, glass, carbon and graphite fibers, zinc, titanium, zirconium, ground quartz, metallic silicates, and metallic powders.

Another embodiment of the present application relates to a method of adhering substrates together. The method includes providing a plurality of substrates, and applying one of the polymers of the present application to one or more of the substrates. The substrates are then joined together with the applied polymer.

In an additional method of adhering substrates together the polymer is laminated between two substrate layers under conditions effective to form a seal.

The polyurethane and polyester polymers of the present application can be used in coatings and in laminates, specifically the polymers may be useful in coatings and laminates for the food packaging industry. Containers used for packaging food items such as food, beer and beverages must meet strict standards. These requirements generally include excellent curability, excellent coating adhesion, fog resistance, retort resistance, and corrosion resistance.

The laminates of the present application include film-to-film and film-to-foil laminates. In general, use the typical film substrates known in the art. Thus, the film material can be a polyolefin such as LDPE, PE or PP, or a polyester such as PET; the second substrate can be another, often thicker polyolefin such as PE or PP, or a PET or nylon film. Metalized films such as metalized PP or PET can also be used.

Lamination can be done either in-line or off-line. For off-line laminating, a substrate is preferably pre-coated with the adhesive, and this pre-coated film is later laminated to a second substrate by heat sealing. In-line lamination of the two films can be done directly in the nip (the laminating station), or in a second nip using a release-roller in the first nip to squeeze out any entrapped air between the first film and the extruded ("pre-formed") adhesive film. Entrapped air can also be squeezed out using this same technique for off-line lamination. Alternatively, the polyurethane and/or polyester adhesives can be used in the form of a web or sheet material, such as can be used for the production of bags or pouches, or for wrapping purposes.

Further examples of the methods of forming food packaging, and laminates suitable for food contact are disclosed in U.S. Pat. No. 5,958,486 to Ringdahl et al.; U.S. Pat. No. 4,291,085 to Ito et al.; U.S. Pat. No. 3,949,114 to Viola et al.; U.S. Pat. No. 4,559,266 to Misasa et al.; and U.S. Pat. No. 4,702,963 to Phillips et al., all of which are hereby incorporated by reference in their entirety.

The polyurethane and polyester polymer coating compositions of the present application can optionally include one or more lubricants. Lubricants may be used for one or more of the following effects and include, but are not limited to, improving the ease of handling of coated substrates, improving scratch resistance or manufacturing capacity. Suitable lubricants that can be used in the present application include, for example, polyethylene, and natural lubricants such as carnauba wax. Typical amounts of lubricant that can be used in the present application depend on the particular application, preferably about 2 wt % or less, more preferably about 0.1 to 1.5 wt %, and most preferably about 0.1 wt % of the coating composition.

The coating composition of the present application may also include a pigment. Pigments are preferably used to give the coating composition the required finishing treatment on the packaging. Suitable pigments for use in the present application are present in an amount sufficient to give the coated substrate the desired opacity, color, finish texture and/or general aesthetic quality. Suitable pigments include aluminum oxide, titanium oxide, zinc oxide, and the like. The typical amount of pigment that can be used in the present application depends on the intended finish and is preferably less than about 30 wt % of the coating composition.

In some embodiments of the present application, rheology or flow control agents may preferably be included in the polyurethane and/or polyester polymer coating compositions. The rheology or flow control agent of the present application can provide the coating composition with an improved ability to coat uniformly when applied to a substrate. Suitable rheology or flow control agents include acrylics, silicones, waxes, and the like.

The polyurethane and/or polyester polymer coating compositions of the present application may comprise an optional carrier. The optional carrier provides a vehicle that facilitates delivery of the coating composition to the intended substrate. Preferably, the carrier used in the present application is present in an amount sufficient to produce a uniform, blister-free coating. The carrier of the present application is preferably removable by heat (and/or vacuum stripping), for example, during the curing process. Suitable carriers for the coating composition of the present application include water and other organic solvents such as alcohols, ketones, esters, aromatic and aliphatic hydrocarbons. Examples of suitable organic solvents include xylene, toluene, methyl ethyl ketone, methyl amyl ketone, methyl isobutyl ketone, dibasic ester, propylene carbonate, N-methylpyrrolidone, and the like.

With increased awareness of renewable resources, there has been high demand for the use of bio-based raw materials. Due to their abundance and sustainability, plant extracts and oils are desirable as chemical feedstocks in the synthesis of polyurethane (PU) coatings and polymers. Traditionally, plant oils and extracts required chemical modification for use in plant-based polyurethanes to introduce functional groups in the chemical structure capable of polymerization. Both castor oil and *Physaria* oil contain hydroxyl functional groups in their fatty acid side chain capable of crosslinking and chain extension, respectively. This application focuses on two different PU film formulations, one consisting of unmodified castor oil and *Physaria* oil and one consisting of only *Physaria* oil where both were cured with different aliphatic isocyanates to formulate high-performance, plant-based paperboard coatings for rapid reheat food packaging applications. The chemical and physical properties of each coating formulation, including Tg, thermal properties, surface roughness, and hydrophobicity of polyurethane networks are reported. Understanding the structure-property relationships of the polymer networks will enable formulating next generation bio-based coatings for food packaging applications.

With increased efforts toward sustainability and minimizing the usage of petrochemical-based coatings and adhesives, renewable and biobased plant oils provide a nontoxic, green and cost-effective alternative. One such plant oil is derived from *Euphorbia lagascae* Sprengel seeds, grown in Spain, Italy, and potentially Canada, with the ability to grow in unfavorable conditions (Chakraborty et al., "Exploring the Weed Biology of Two Potentially Novel Oilseed Crops: *Euphorbia lagascae* and *Centrapalus pauciflorus,*" *Can. J. Plant Sci.* 96(4):677-688 (2016), which is hereby incorporated by reference in its entirety). The seeds are cultivated in nitrogen-rich soil and produce flowers between March to April in Spain (Scott et al., "*Euphorbia Lagascae* Spreng. Enzyme Activity in the Seed," *J. Am. Oil Chem. Soc.* 43(7):466-468 (1966), which is hereby incorporated by reference in its entirety). Due to its natural chemical composition, the extracted oil does not require a further epoxidation reaction step when compared to other plants such as soya bean. As such, the plant oil extract from *Euphorbia lagascae* Sprengel seeds have yielded a unique epoxy-functional oil containing approximately 64% vernolic acid and on average two epoxide functional groups (epoxy-equivalent weight (EEW): 676.50 g/eq) (Muuse et al., "Composition and Physical Properties of Oils From New Oilseed Crops," *Industrial Crops & Products* 1(1):57-65 (1992), which is hereby incorporated by reference in its entirety). This natural epoxide functionality allows for easy chemical modification for use in adhesives, particularly through epoxy-carboxylic acid reaction.

Preferences and options for a given aspect, feature, embodiment, or parameter of the technology described herein should, unless the context indicates otherwise, be regarded as having been disclosed in combination with any and all preferences and options for all other aspects, features, embodiments, and parameters of the technology.

The following Examples are presented to illustrate various aspects of the present application, but are not intended to limit the scope of the claimed application.

EXAMPLES

Example 1—Polyurethane Formation of *Physaria fendleri* Oil, Castor Oil and Polycaprolactone Diol Materials The refined, bleached, and deodorized *Physaria fendleri* (hydroxyl number=216.6 mg KOH/g) was donated by the United States Department of Agriculture. Castor oil and xylenes (>98%) were received from Alfa Aesar. Hexamethylene diisocyanate (HDI), poly(hexamethylene diisocyanate) (PHDI), and polycaprolactone diol (PCL Diol, 2000 g/mol) were obtained from Sigma Aldrich. Dicyclohexylmethane 4, 4'-diiocyanate (HMDI) was received from TCI, and isophorone diisocyanate (98%) (IPDI) was attained from Agros Organics.

Polymerization Procedure

For the Castor-*Physaria* oil formulations, PCL diol was heated at 70° C. until melted and separated into three 20 mL scintillation vials. Then, 1 gram of solvent (xylenes) was added to each vial and vortexed until homogenized. The castor oil and *Physaria* oils were then added to the PCL diol/solvent vials. In three separate additional scintillation vials, PHDI and 1 gram of solvent was added, then each corresponding aliphatic isocyanate (HDI, HMDI, and IPDI) was added to the vial and vortexed until homogenized. The hydroxyl-functional containing vials were then transferred to the isocyanate-functional containing vials. Each vial was stirred and heated (~180° C.) on a heating/stir plate for 1 hour until a visual increase in viscosity was observed. Once the coating increased in viscosity, the coatings were drawn-down on polypropylene (PP) boards at 4 mils wet to afford free films. This procedure was repeated for the *Physaria* formulations with the absence of castor oil. The coatings applied to the PP boards were conditioned for 24 hours under ambient conditions followed by a force cure at 75° C. for 1 hour. The coatings were then cooled to room temperature and characterized. The relative ratios of the reagents for the formation of the Castor-*Physaria* polyurethane formations and *Physaria* polyurethane formations with each of the aliphatic isocyanates are disclosed in Table 1.

TABLE 1

Equivalents for the Formulation of Castor-*Physaria* Polyurethane

| | Castor-*Physaria* Formulation | | | *Physaria* Formulation | | |
|---|---|---|---|---|---|---|
| Chemical | HDI | HMDI | IDPI | HDI | HMDI | IPDI |
| HDI | 0.7 | 0 | 0 | 0.7 | 0 | 0 |
| HMDI | 0 | 0.7 | 0 | 0 | 0.7 | 0 |
| IPDI | 0 | 0 | 0.7 | 0 | 0 | 0.7 |

TABLE 1-continued

Equivalents for the Formulation of Castor-*Physaria* Polyurethane

| | Castor-*Physaria* Formulation | | | *Physaria* Formulation | | |
|---|---|---|---|---|---|---|
| Chemical | HDI | HMDI | IDPI | HDI | HMDI | IPDI |
| PHI | 0.3 | 0.3 | 0.3 | 0.3 | 0.3 | 0.3 |
| Castor Oil | 0.4 | 0.4 | 0.4 | 0 | 0 | 0 |
| *Physaria* Oil | 0.2 | 0.2 | 0.2 | 0.6 | 0.6 | 0.6 |
| PCL Diol | 0.4 | 0.4 | 0.4 | 0.4 | 0.4 | 0.4 |

Characterization Procedures
Fourier-Transform Infrared Spectroscopy (FT-IR)

Attenuated total reflectance infrared (ATR-IR) spectra were collected using a Golden Gate ATR stage attached to a Nicolet 6700 Infrared spectrometer at ambient temperature (Walham, MA), fitted with a ZnSe crystal stage resulting in 12 sample reflections. The spectrum of each thin film coating was collected with 32 scans and a resolution of 2 $cm^{-1}$.

Modulated Differential Scanning Calorimetry

Thermal transitions of the six different PU coatings were measured between 10° C. and 250° C. using a modulated temperature profile at a rate of 2° C./minute with a modulation amplitude of ±1° C. over a period of 60 seconds with a TA Instruments Q2000 differential scanning calorimeter (DSC) (New Castle, DE) in a nitrogen atmosphere. A specimen of each coating sample was charged into a hermetically sealed aluminum T-zero DSC pan.

Thermogravimetric Analysis (TGA)

Weight change of the PU coatings was quantified via thermogravimetric analysis using a TA Instruments Q5000-IR thermogravimetric analyzer (New Castle, DE). The samples (5-10 mg) were charged into a platinum pan then heated at 10° C./minute to 600° C. under nitrogen atmosphere.

Surface Roughness and Contact Angle Measurements

Figure 3:
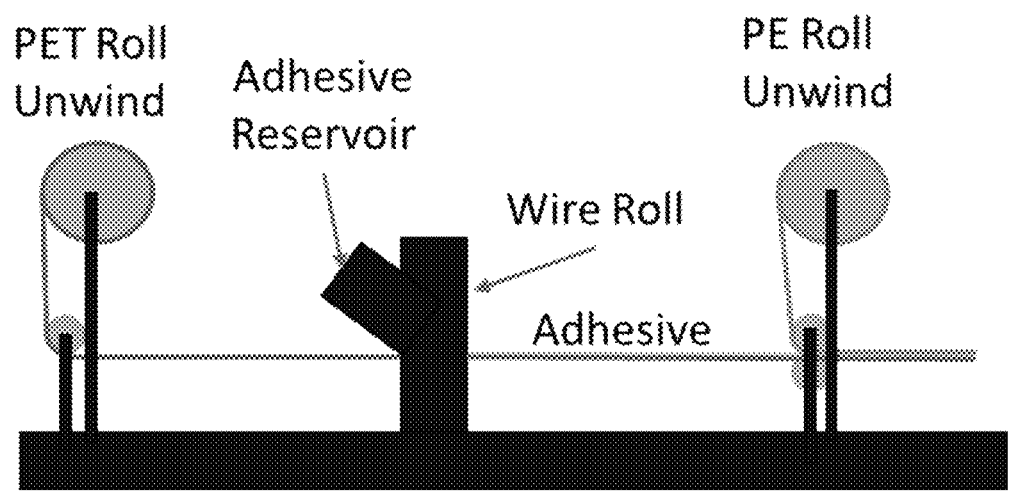
FIG. 3 shows the application of the adhesive formulations of the present application.

The surface roughness of the coated paper samples was analyzed via 3D Laser Scanning Confocal Microscope (VK-x1000 series, Keyence, Japan). The adhesive formulations were laminated between a polyester multilayer film and low-density polyethylene film using a ChemInstruments Laboratory Laminator (Fairfield, OH) (FIG. 3). The adhesive was applied with a wet thickness of 2 mil at a speed of 150 inches/minute.

Results and Discussion of Example 1

Figure 4:
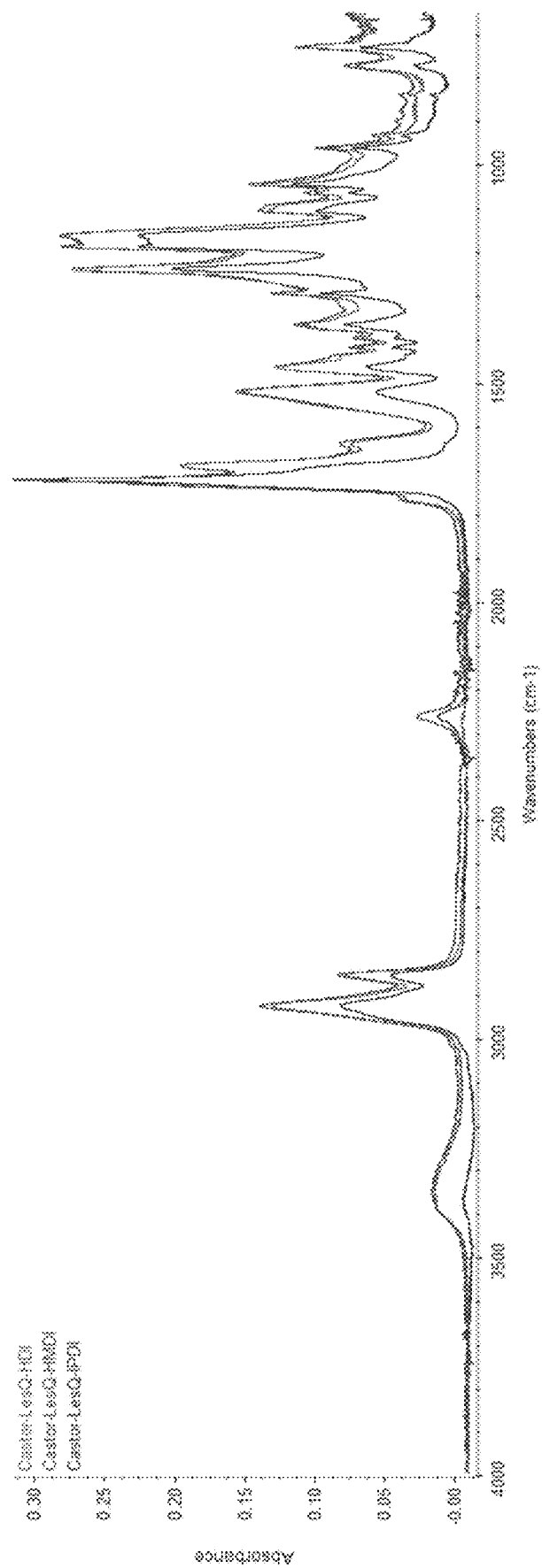
FIG. 4 is the IR spectra of the three Castor-*Physaria* coatings of Example 1.
Figure 5:
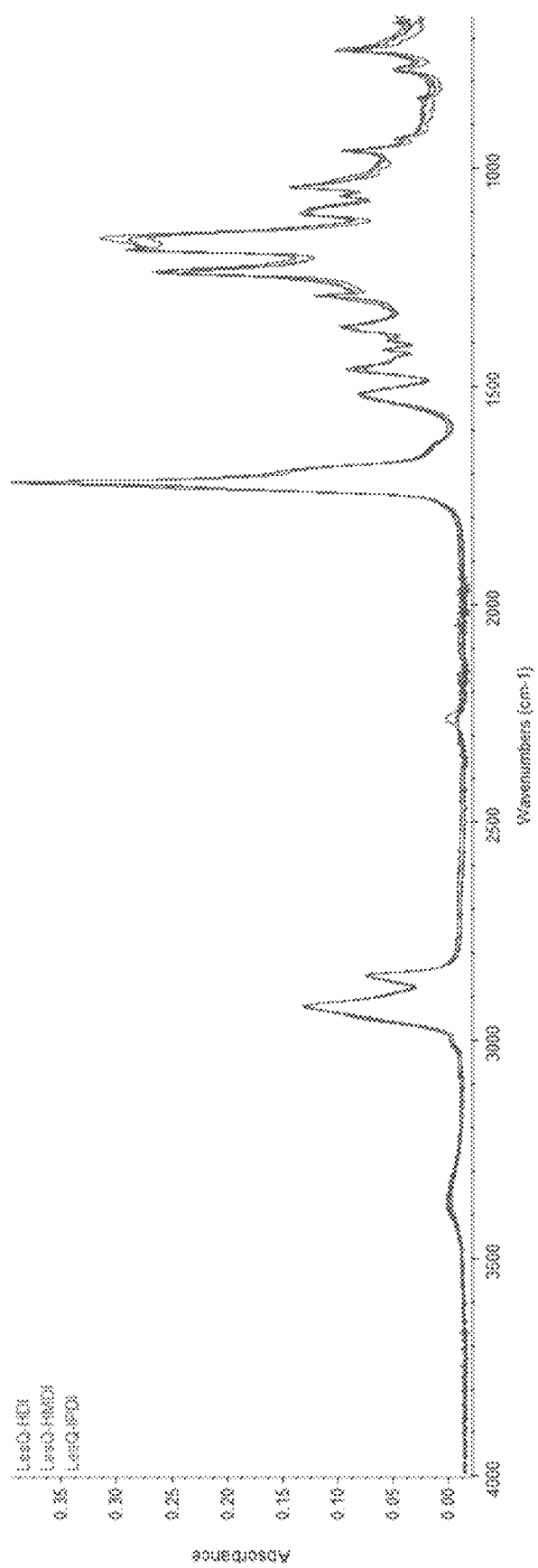
FIG. 5 is the IR spectra of the three *Physaria* coatings of Example 1.

The ATR-IR spectra of the Castor-*Physaria* and *Physaria* coatings (FIG. 4 and FIG. 5, respectively) show a peak around 3349-3367 $cm^{-1}$ corresponding to amide N—H stretching in a urethane. The Castor-*Physaria*-HMDI, Castor-*Physaria*-IPDI, and *Physaria*-HMDI polymer spectra show a peak around 2263-2264 $cm^{-1}$, indicating residual isocyanate functional groups, whereas the Castor-*Physaria*-HDI, *Physaria*—HDI, and *Physaria*-IPDI polymers did not have a peak attributed to any remaining isocyanate functional groups. The Castor-*Physaria* and *Physaria* polymer spectra show a peak around 1520-1522 $cm^{-1}$ corresponding to a (C—N—H) urethane linkage, and a peak around 1722 $cm^{-1}$ corresponding to the ester carbonyls of castor and *Physaria* oils and the urethane carbonyl. The Castor-*Physaria* and *Physaria* polymer spectra show peaks around 2855-2856 $cm^{-1}$ and 2925-2926 $cm^{-1}$, indicating the presence of asymmetric and symmetric $CH_2$ stretching, corresponding to the hydrocarbon chains in the material from the oils and aliphatic isocyanates.

DSC was used to determine each coating's glass transition temperature (Tg), shown in Table 2, below. The Castor-*Physaria* coatings varied in Tg values, while the *Physaria* coatings had a much smaller range of Tg values. The Tg of PCL diol was −67° C., due to its molecular weight being 2000 g/mol. TGA was used to measure volatile content (weight change) as an indicator of potential migrants at elevated temperatures. All coatings had less than 1% loss of volatile content at 200° C.

TABLE 2

TGA and MDSC data of the Castor-*Physaria* and *Physaria* free films.

| Polymer | Tg (° C.) | Weight loss at 200° C. (%) |
| --- | --- | --- |
| Castor-*Physaria*-HDI | 147 | 0.17 |
| Castor-*Physaria*-HMDI | 101 | 0.77 |
| Castor-*Physaria*-IPDI | −40 | 0.27 |
| *Physaria*-HDI | 32 | 0.15 |
| *Physaria*-HMDI | 29 | 0.24 |
| *Physaria*-IPDI | 22 | 0.27 |

FIGS. 6A-6C and FIGS. 7A-7C show the DIC images of the Castor-*Physaria* and *Physaria* coatings, respectively. The surface roughness of Castor-*Physaria*-HDI and Castor-*Physaria*-HMDI coatings did not have an influence on the contact angle values, as shown in Table 3. The Castor-*Physaria*-IPDI coating had the highest surface roughness and the highest contact angle of the formulation series. When castor oil was removed from the formulation, the contact angle decreased (Table 3). There was no difference in contact angle between the *Physaria*-HDI and *Physaria*-IPDI coatings, although the surface roughness of the samples were not similar. FIGS. 8A-8C and FIGS. 9A-9C show the droplets for contact angle measurement for the formulations of Castor-*Physaria* polymers and *Physaria* polymers, respectively. Traditionally, paper substrates are hydrophilic and the introduction of the polymer coatings created a hydrophobic substrate.

TABLE 3

Surface roughness and contact angle values of Castor-*Physaria* and *Physaria* coatings on paper substrate

| Polymer | Roughness (μm) | Contact angle (°) |
| --- | --- | --- |
| Castor-*Physaria*-HDI | 0.94 | 104 |
| Castor-*Physaria*-HMDI | 0.48 | 104 |
| Castor-*Physaria*-IPDI | 1.7 | 119 |
| *Physaria*-HDI | 4.0 | 98 |
| *Physaria*-HMDI | 0.44 | 93 |
| *Physaria*-IPDI | 1.2 | 98 |

This example focused on comparing plant-based PU coatings formulated with Castor and *Physaria* oils with various aliphatic isocyanates. The films were formulated without modifying the oils, without catalysts, or metal driers, to create thin plant-derived polyurethane films. The equivalence ratio of isocyanate to hydroxyl group, was 1:1, as shown in Table 1. These Castor-*Physaria* and *Physaria* films have potential to be used as a renewable feedstock for the food industry, industrial, and automotive coatings and adhesives.

Example 2—Polyurethane Formation of *Physaria fendleri* Oil, Castor Oil, and Isosorbide Materials Refined, bleached, and deodorized *Physaria fendleri* oil (*Physaria*) (hydroxyl number=216.6 mg KOH/g) was prepared by USDA National Center for Agricultural Utilization Research, Peoria, IL as described previously (R. L. Evangelista, *Industrial Crops and Products* 29:189-196 (2009), which is hereby incorporated by reference in its entirety). Castor oil (hydroxyl number 156-165 mg KOH/g) was used as received from Alfa Aesar (Gurunathan et al., *Prog. Org. Coat.* 80:39-48 (2015), which is hereby incorporated by reference in its entirety). Hexamethylene diisocyanate (HDI) and poly(hexamethylene diisocyanate) (PHDI) were obtained from Sigma Aldrich. Isosorbide and dibutyltin dilaurate (DBTDL) were received from TCI, and methyl ethyl ketone (MEK) was obtained from Fisher Scientific. All materials were used as received.

Polymerization Procedure

PVA Coated Petri Dishes

PVA coated petri dishes were prepared before the formation of the polymer adhesives as follows: polystyrene petri dishes were sprayed with a polyvinyl alcohol (PVA) release agent. The PVA was sprayed at 20 PSI, and two coats were applied to the Petri dishes.

Polymer Adhesive Formulation

Isosorbide was dissolved in MEK at 4.6 wt % in a 20 mL scintillation vial via planetary mixer at room temperature (FlackTek SpeedMixer, 1500 RPM for 2 min). The isocyanates for each formulation were mixed according to Table 4 and added to the isosorbide, then mixed in the planetary mixer to ensure a homogeneous mixture (1500 RPM for 2 min). Note that isocyanates are toxic materials and the appropriate mitigation personal protection equipment should be used when handling (gloves, chemical fume hood, etc.). The corresponding amount of *Physaria* oil and castor oil for each formulation was individually added and mixed via the planetary mixer (1500 RPM for 2 min). DBTDL (5 wt %) was added to the scintillation vial and mixed. After 5 min, each formulation was poured into a polyvinyl alcohol coated Petri dish then conditioned overnight at ambient conditions, followed by an elevated temperature cure at 80° C. for 1 h. The samples were removed from the dishes, rinsed with DI water, and dabbed dry to remove residual PVA from the surface of the sample. The samples were dried at 100° C. for 5 min.

The five different formulations systematically varied castor and *Physaria* oil content while maintaining the total equivalents of trifunctional molecules, to keep the cross-linking density relatively the same, and keeping the amount of isosorbide constant. Table 4 indicates the molar equivalents of the *Physaria* oil. The total equivalents indicated in Table 4 are the equivalents of the reactive groups of the compounds added to the formulation. For example, isosorbide has two reactive alcohol groups. Therefore, one mole of isosorbide was added to the formulation.

TABLE 4

Plant oil extract based polyurethane adhesive formulations created on equivalents of hydroxyl and isocyanate functional groups.

| Chemical | 4.5 mol | 3.75 mol | 3 mol | 1.5 mol | 0 mol |
|---|---|---|---|---|---|
| | Total Equivalents | | | | |
| Castor Oil | 0 | 1.5 | 3 | 6 | 9 |
| *Physaria* Oil | 9 | 7.5 | 6 | 3 | 0 |
| Isosorbide | 2 | 2 | 2 | 2 | 2 |
| Polyhexamethylene diisocyanate (PHDI) (NCO) | 9 | 7.5 | 6 | 3 | 0 |
| Hexamethylene diisocyanate (HDI) (NCO) | 2 | 3.5 | 5 | 8 | 11 |

Preparation of Laminated Specimens

Two-layer films were prepared using each adhesive formulation in Table 1 to adhere polyethylene terephthalate (PET) film to polyethylene film using an automatic wire coater (Hot Melt Laboratory Coater Laminator, ChemInstruments model HLCL—1000, Fairfield, OH) equipped with a #20 rod for a targeted wet thickness of 50.8 microns (2 mil). The adhesives were prepared according to Table 4. Each formulation was conditioned at room temperature for 10 min after the addition of catalyst to increase viscosity then added to the reservoir prior to application to the PET film with a wet thickness of 2 mils at a speed of 80 in./min. PE film was adhered to the coated PET film with pressure applied at the point of contact using nip rollers at 80 PSI (see FIG. 3). The samples were then post-cured at 80° C. for 1 hr.

Characterization Procedures

Fourier-Transform Infrared Spectroscopy (FT-IR)

Attenuated total reflectance infrared spectra (ATR-IR) were collected using a diamond Golden Gate ATR stage attached to a Nicolet 6700 infrared spectrometer (Waltham, MA) at ambient temperature. Each spectrum was collected with 32 scans and a resolution of 2 cm$^{-1}$. The Nicolet 6700 infrared spectrometer was then fitted with a vertical sample holder to collect transmission spectra for each adhesive formulation using the same instrumental parameters. All spectra were baseline corrected before analysis with Omnic 8.3 software (Thermo Fisher, Waltham, MA).

Differential Scanning Calorimetry (DSC)

Adhesive thermal transitions were measured between −70° C. and 250° C. using a Heat/Cool/Heat profile at a rate of 10° C./min according to ASTM D3418 Standard Test Method for Transition Temperatures and Enthalpies of Fusion and Crystallization of Polymers by Differential Scanning Calorimetry with a TA Instruments Q2000 differential scanning calorimeter (New Castle, DE) in a nitrogen atmosphere (ASTM, Journal, ASTM D3418-15 (2015), which is hereby incorporated by reference in its entirety). A specimen of each adhesive sample (5-10 mg) was charged into a hermetically sealed aluminum T-zero DSC pan.

Thermogravimetric Analysis (TGA)

Mass loss as a function of temperature for each PU adhesive was quantified via thermogravimetric analysis using a TA Instruments Q5000-IR thermogravimetric analyzer (New Castle, DE). The adhesive specimen (n=3) of each sample (5-10 mg) was charged into a platinum pan then heated at 10° C./min from 25° C. to 600° C. under a nitrogen atmosphere.

Contact Angle Measurements

Liquid adhesive wettability on PET and PE substrates were evaluated through contact angle measurement with a ramé-hart Model 250 Standard Goniometer (Succasunna, NJ). The microsyringe was filled with the appropriate adhesive formulation (Table 4) and a 22 gauge needle was used to deliver a 2 μL droplet to the surface. The process was video recorded with DROPimage Advanced v2.8 software. The angle was measured after the needle was retracted and the droplet was in contact with the substrate.

Peel-Strength

Figure 10:
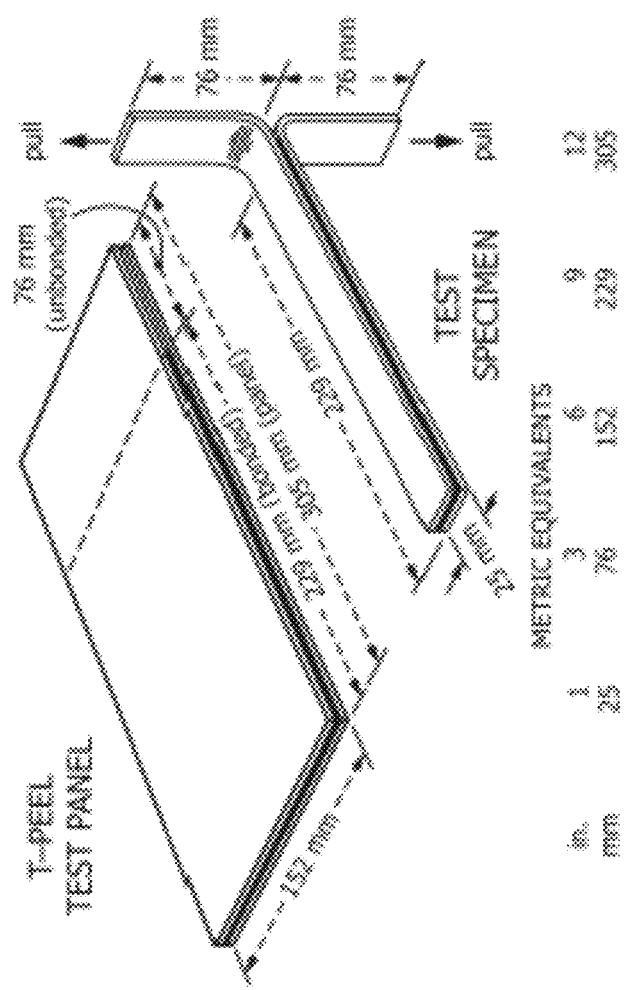
FIG. 10 is a graphical depiction of the ATSM Peel Test D1876-08.

The peel strength of the polyurethane adhesive was quantified following ASTM D1876-08 Standard Test method for Peel Resistance of Adhesives (see FIG. 10) on a Mark-10 EMS303 test stand equipped with a 22 N load cell (ASTM, Journal, D1876-08(2015)e1 (2015), which is hereby incorporated by reference in its entirety). The test strips 2.54 cm (1 in.) wide×30.48 cm (12 in.) in length consisted of a PET film adhered to PE as prepared above. All ten specimens from each sample formulation were tested at an angle of 180° with a crosshead speed of 0.253 mm/min (10 in./min.). The type of failure (cohesive vs adhesive) was also determined via confocal microscopy.

Confocal Microscopy

The average arithmetic mean height (Sa) was used to determine the surface roughness values of the adhesive on the PET and PE substrate. After the peel-test, the PE and PET surfaces were analyzed to determine the type of failure. The adhesive surface was analysed for surface roughness and microstructure via a 3D Laser Scanning Confocal Microscope (VK-x1000 series, Keyence, Japan). The measurements were collected at 20× magnification.

Statistical Analysis

Differences between mean values were evaluated via one-way analysis of variance (ANOVA) at a 95% confidence interval via GraphPad Prism 8.4.3. Tukey's post hoc analysis was used to group mean values that were statistically the same (J. Moser, *J. Chemom.* 18:272-273 (2004); Ellison et al., *Practical Statistics for the Analytical Scientist: A Bench Guide*, The Royal Society of Chemistry, Cambridge, 2nd ed. (2009), which are hereby incorporated by reference in their entirety). Four different replicates were utilized for each formulation to validate reproducibility. For ATR-IR, Transmission IR, DSC, and TGA, three specimens were tested for each formulation-replicate pair (12 per formulation). Ten specimens were evaluated for peel-strength per formulation replicate (40 per formulation).

Results and Discussion of Example 2

Fourier-Transform Infrared Spectroscopy (FT-IR)

Figure 11:
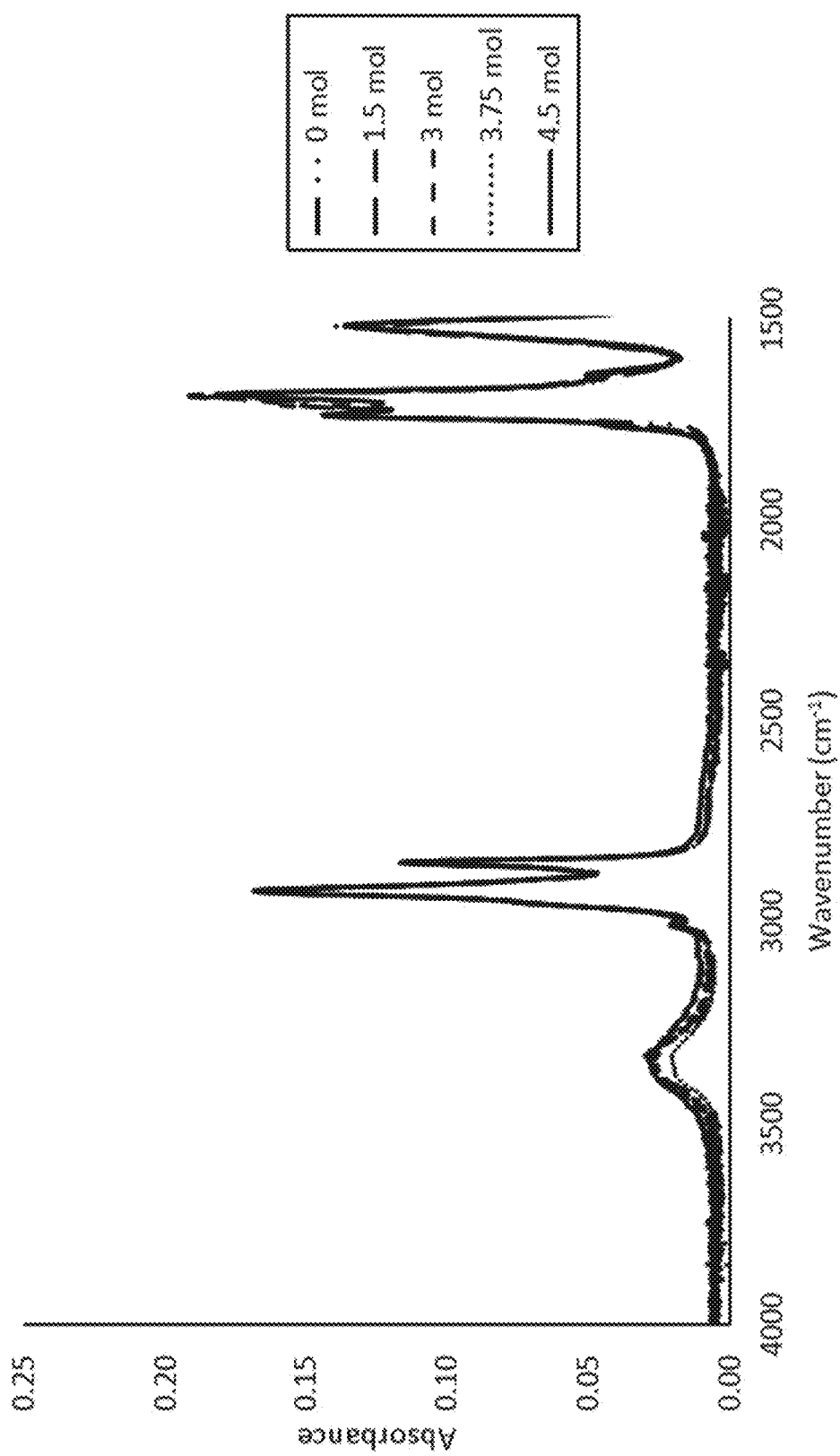
FIG. 11 is the ATR-IR spectra for the five adhesive formulations of Example 2, exhibiting a urethane peak 3500-3000 $cm^{-1}$ and no isocyanate peak round 2300 $cm^{-1}$.
Figure 12:
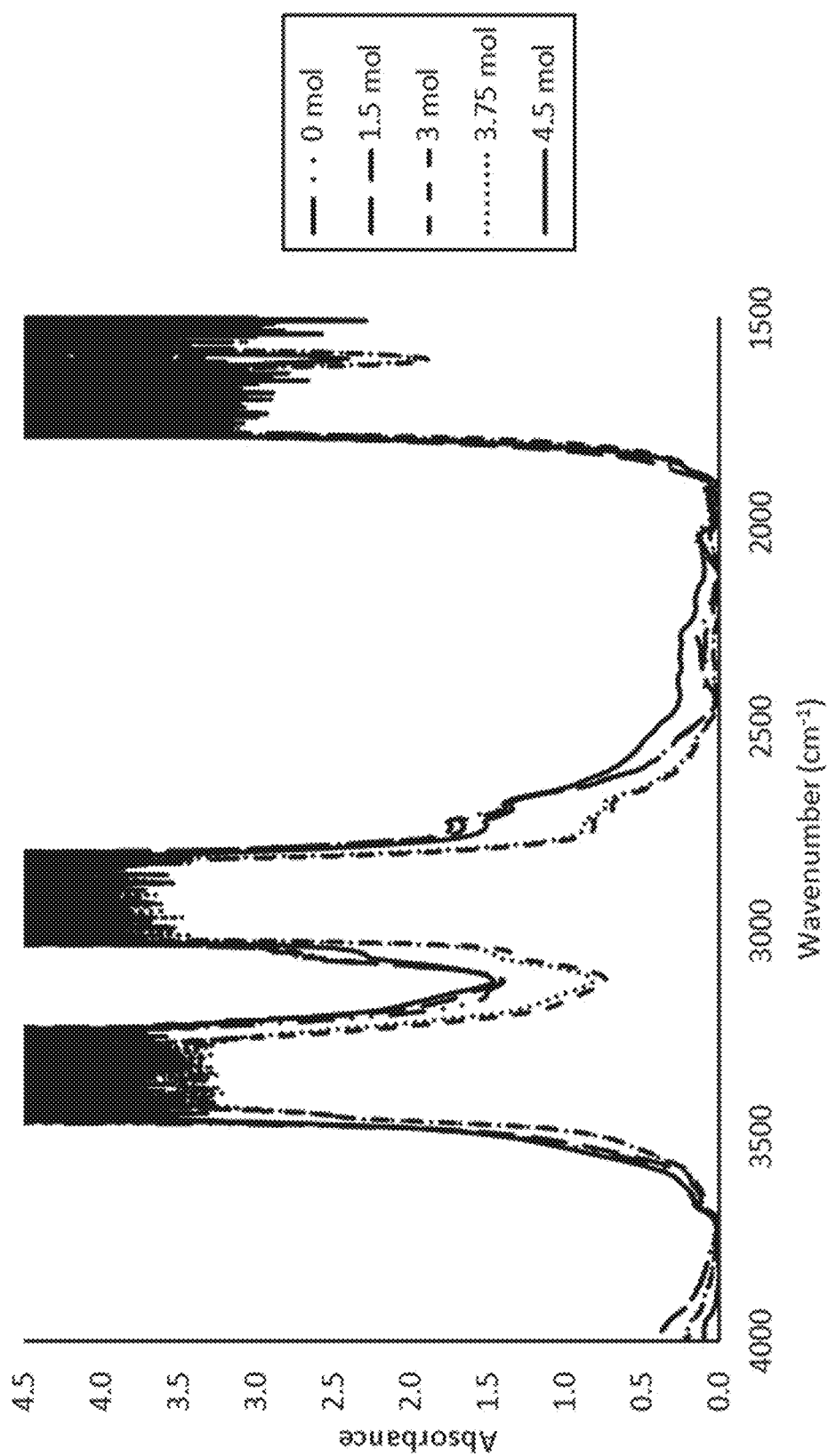
FIG. 12 is the Transmission spectra for the five adhesive formulations of Example 2 post-cure indicating no residual isocyanate peak around 2300 $cm^{-1}$.

Attenuated total reflectance and transmission sampling techniques were used to detect residual monomeric isocyanate on the surface and throughout the adhesive specimens as a method to understand extent of cure. Furthermore, maximum monomer reaction conversion is important to minimize small molecule migration through substrates into food products and to maximize adhesive performance. ATR and transmission infrared spectra of the five *Physaria* oil adhesive formulations (FIG. 11 and FIG. 12) possess a characteristic peak at 3349-3367 cm$^{-1}$ corresponding to the urethane amide N—H stretching (Macalino et al., *IOP Conf Ser.: Mater. Sci. Eng.*, 229:012016/012011-012016/012016 (2017), which is hereby incorporated by reference in its entirety). The absence of a signal at 2263-2264 cm$^{-1}$ in both ATR and transmission spectra indicated no detectable residual isocyanate functional groups suggesting a complete cure. All adhesive spectra possess a characteristic band at 1520-1522 cm$^{-1}$ corresponding to a (C—N—H) urethane linkage and a peak at 1722 cm$^{-1}$ corresponding to the ester carbonyls of castor and *Physaria* oil and the urethane carbonyl. Differences in each of the spectra within FIG. 11 and FIG. 12 were not anticipated because the formulations consist of the same chemical compounds, only varying in C18 content from varying concentrations of *Physaria* oil.

Differential Scanning Calorimetry (DSC)

The measured glass transition temperature (Tg) of the adhesive formulations as a function of *Physaria* oil content was determined via DSC. The measured Tg is influenced by crosslink density, polymer chemical structure, and environmental parameters (e.g. humidity) (Kong et al., *Int. J. Adhes.* 31:559-564 (2011); Curtzwiler et al., *CoatingsTech* 11:40-51 (2014); Curtzwiler et al., *CoatingsTech* 11:28-38 (2014); which are hereby incorporated by reference in their entirety). The formulation with no *Physaria* oil has the highest Tg with a value of −25° C., whereas formulations with 3.75 mol and 4.5 mol *Physaria* oil each have the lowest Tg of −44° C. and were statistically the same; all other formulations possessed Tgs that were statistically different ($p<0.05$).

Figure 13:
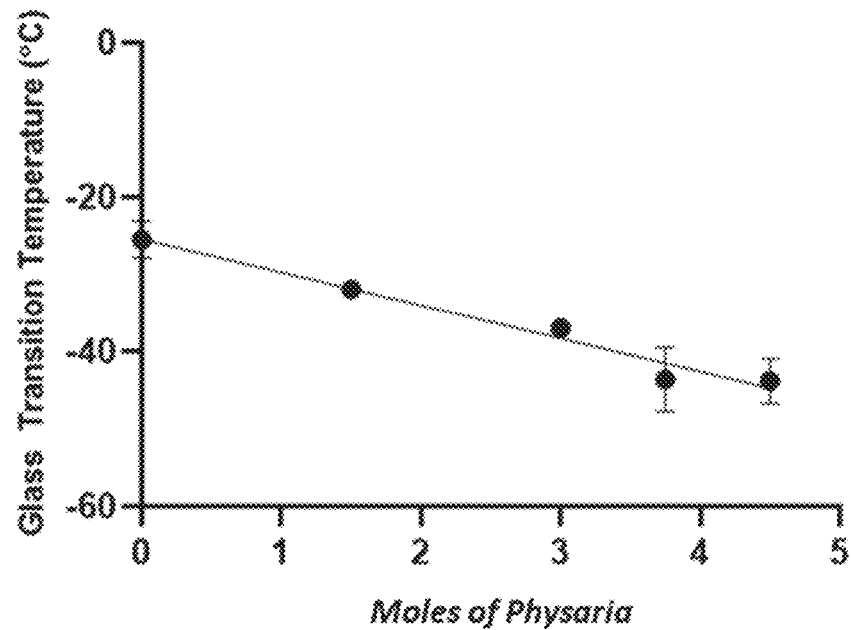
FIG. 13 is a graphical plot of the measured glass transition temperatures from DSC analysis of the adhesive formulations of Example 2.

The adhesive Tg influences the final adhesive properties and the stiffness of the chains will affect wetting of the adhesive on the surface of the desired substrate (Jovanovic and Dube, *Ind. Eng. Chem. Res.* 44:6668-6675 (2005), which is hereby incorporated by reference in its entirety). The hydrocarbon side chain of *Physaria* oil can increase free volume by creating more unoccupied space between polymer chains, yielding a reduction in the measured Tg (X. S. Sun, *Plastics Derived from Starch and Poly(lactic acids)* (2005), which is hereby incorporated by reference in its entirety). The trend in FIG. 13 indicates that increasing the concentration of *Physaria* oil results in a lower Tg; which would correspond to an increase in free volume. Since the crosslink density was designed to be as close as possible and with similar volatile loss (FIG. 14), the change in the Tg can logically be attributed to the hydrocarbon side chain of *Physaria* oil. According to the free volume theory, large nonpolar side chains, such as the side group on *Physaria* oil, tend to hold mutually attractive polymer chains apart and lower the Tg (J. Comyn, in *Handbook of Adhesion Technology*, eds. L. F. M. da Silva, A. Ochsner and R. D. Adams, Springer Berlin Heidelberg, Berlin, Heidelberg, DOI: 10.1007/978-3-642-01169-6_18, pp. 415-442 (2011), which is hereby incorporated by reference in its entirety). Therefore, an increased amount of *Physaria* oil leads to an increase of free volume and therefore a decreased Tg (T. G. Fox, *Bull. Am. Phys. Soc.* 1:123 (1956), which is hereby incorporated by reference in its entirety).

Thermogravimetric Analysis (TGA)

Figure 14:
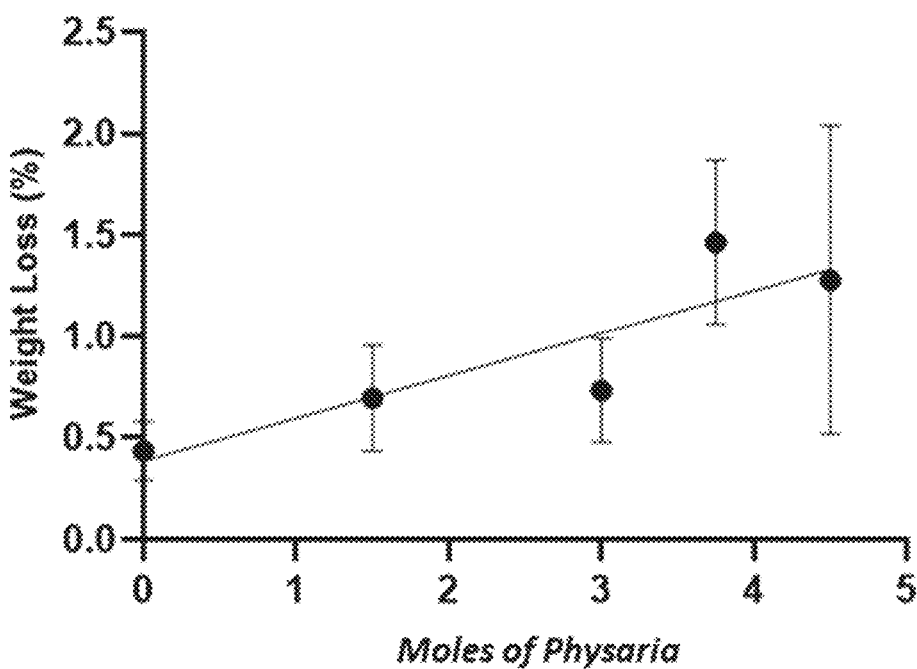
FIG. 14 is a graphical plot of the weight loss at 200° C. for volatiles within the cured adhesive system of Example 2.

The mass loss at 200° C. was measured via TGA of the adhesives to determine the amount of volatile content which can potentially migrate into food at elevated temperatures or artificially influence changes in the Tg (FIG. 14). Crosslinked polymers, such as the PU adhesive formulations here, have the potential to trap small molecules in the polymer structure upon curing due to reduced diffusion coefficients (J. W. Stansbury, *Dent. Mater.* 28:13-22 (2012), which is hereby incorporated by reference in its entirety). From a safety perspective, it is essential to mitigate the small molecule migration and desorption of volatiles from packaging materials into food. Therefore, 200° C. was selected as an excessive abuse temperature as multilayer food packaging is commonly used in frozen-to-microwave applications (J. Comyn, in *Handbook of Adhesion Technology*, eds. L. F. M. da Silva, et al. Springer Berlin Heidelberg, *Berlin, Heidelberg*, pp. 415-442 (2011), which is hereby incorporated by reference in its entirety). Furthermore, PUs undergo severe degradation events when temperatures exceed 200° C. Thus, it is anticipated that volatiles below this temperature have potential to migrate (Arab-Tehrany and Gonzalex, "Transfer Phenomena in Food/Packaging System" in *Functional Polymers in Food Science*, Cirillo et al. Eds, pp. 67-94 (2015), which is hereby incorporated by reference in its entirety) and would be attributed to trapped solvent or unreacted monomers.

The mass loss at 200° C. for all formulations was below 2 wt % and can be attributed to the presence of small, unreacted molecules such as residual monomer/solvent or absorbed water (Liu et al., *Polymers* (Basel, Switz.) 11:697 (2019), which is hereby incorporated by reference in its entirety). Adhesive formulations with higher *Physaria* oil composition possessed higher volatile content which could be a result of increased free volume from the presence of the C18 side chain as suggested by the degrease in the Tg. However, there was higher variability in the results as the *Physaria* oil concentration increased and most formulations possessed mean values that were statistically the same. Tukey's post hoc analysis indicated that only formulations with 0 mol and 3.75 mol of *Physaria* oil were significantly different ($p<0.05$).

Contact Angle Measurements

Figure 15A:
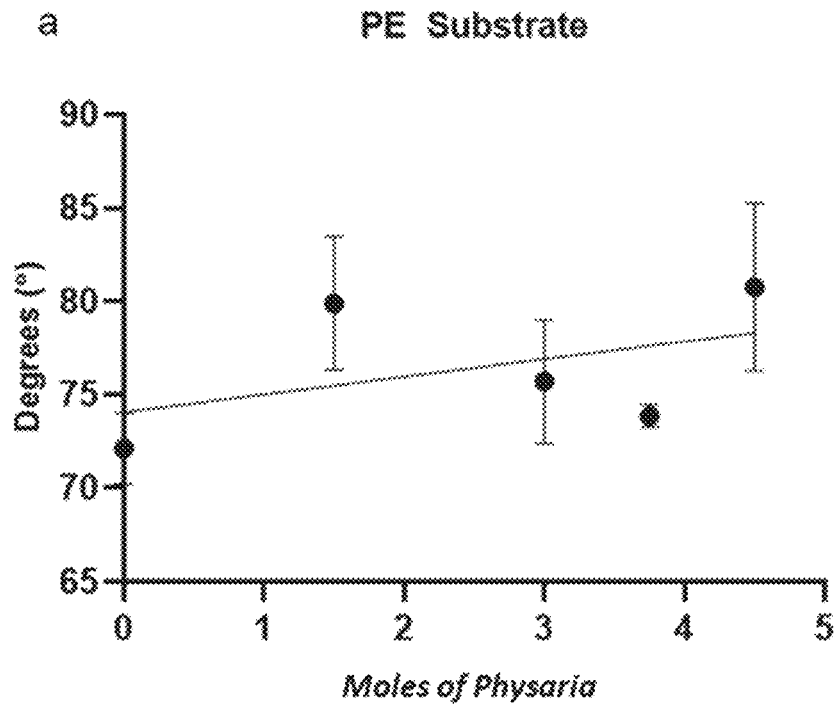
FIGS. 15A-15B are graphical plots of the contact angle measurements of the uncured adhesives of Example 2 on PE (FIG. 15A) and PET (FIG. 15B) substrates to determine wettability of the formulations.
Figure 15B:
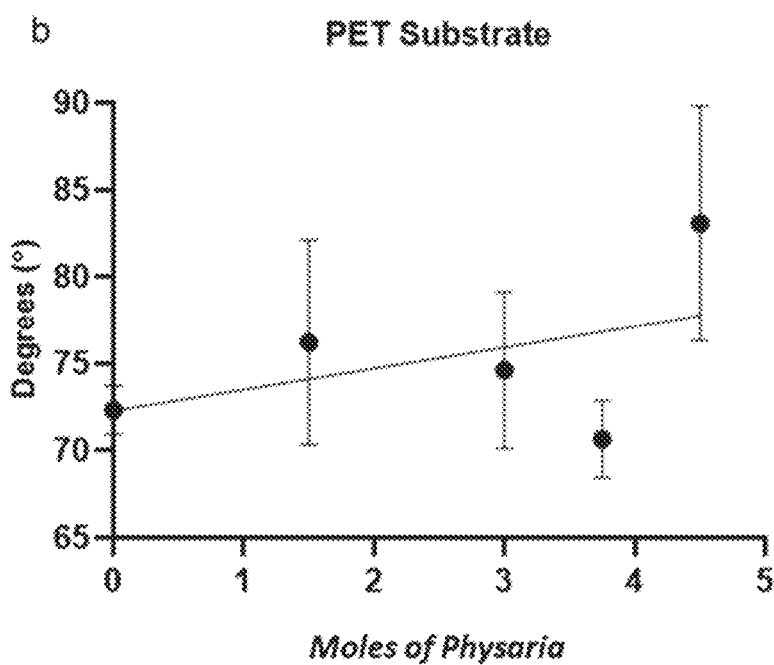

Adhesive wetting on a substrate is critical for strong bonding of two adherends. To measure the wettability of each adhesive formulation in the liquid state (as would be applied to substrates), the contact angle was measured on the PE and PET substrates used for lamination. The adhesive formulation without *Physaria* oil (0 mol) has contact angle values of 72° and 80° for PE and PET substrates, respectively (FIG. 15A). In comparison, formulation 4.5 mol has contact angle values of 80° and 83° for PE and PET, respectively (FIG. 15B). All formulations were determined to have preference for substrate wetting of both the PE and PET substrates (i.e., angles below 90°).

Tukey's post hoc grouping identified a significant difference between formulation 0 mol and 4.5 mol ($p=0.042$). There is no significant difference between the formulations determined by the one-way ANOVA for the contact angle of each formulation with the PET substrate. These data suggest that the hydrocarbon side chain of *Physaria* oil did not practically affect the wetting capabilities of the formulations for the PE and PET substrates. There was no clear trend on the wettability of the applied adhesive as a function of *Physaria* oil content, suggesting that changes in the peel strength will be more dependent upon other properties such as the molecular composition and cohesive strength (Aliakbari et al., *Prog. Org. Coat.* 133:376-386 (2019), which is hereby incorporated by reference in its entirety).

Peel Strength

Figure 16:
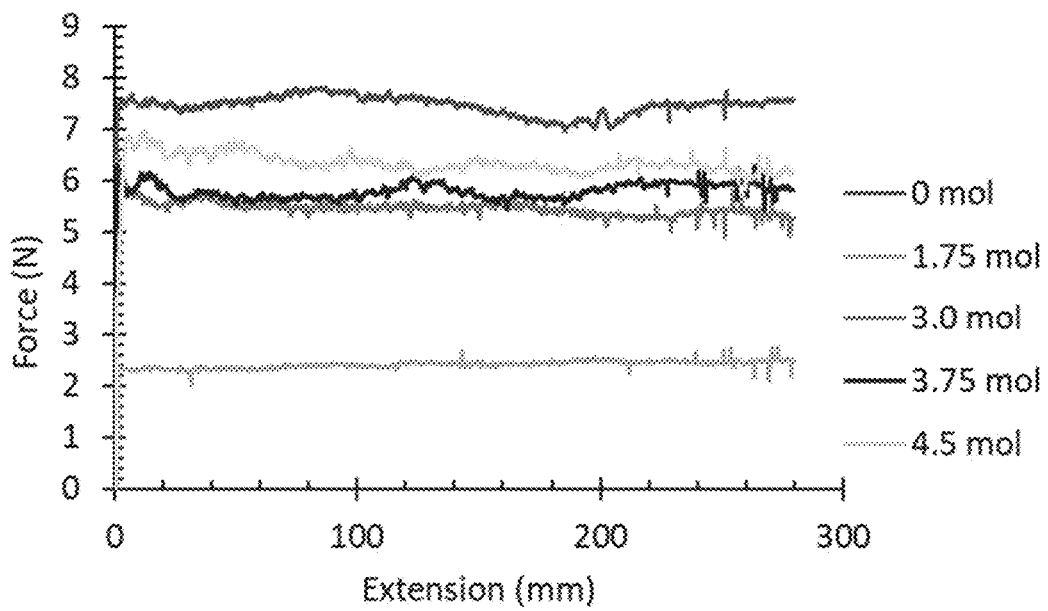
FIG. 16 is a graphical plot of the representative force extension curves of a PE film adhered to a PET film with *Physaria* oil based polyurethane adhesives from Example 2 during peel testing.
Figure 17:
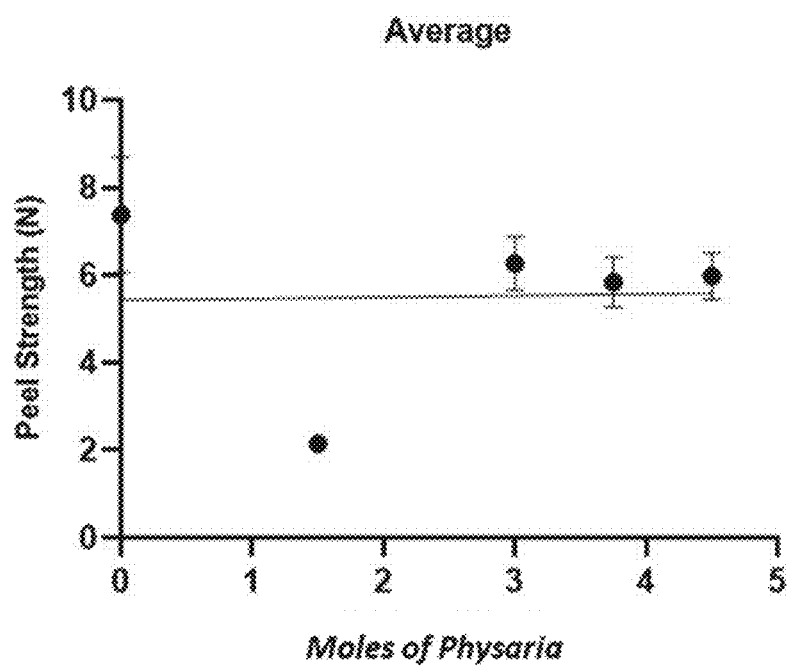
FIG. 17 is a plot of the average peel strength for the five different adhesive formulations of Example 2 between polyethylene and polyester films. The maximum and minimum load plots followed the same trend as the average load strength plot (see FIG. 18 and FIG. 19).

After lamination and force-cure, the samples were tested for peel strength per ASTM D1876 to evaluate the force required to separate two substrates (representative force-extension curves can be found in FIG. 16). The maximum and minimum load plots of the adhesive formulations follow the same visible trend as the average load plot (FIG. 17) and can be found in FIG. 18 and FIG. 19.

The ANOVA results revealed no significant difference between formulations 3.0 mol, 3.75 mol, and 4.5 mol. The average peel strengths of the adhesive samples were comparable except for formulation 1.5 mol with an average peel strength of 2 N which was repeatable across four replicate sample preparations. Tukey' posthoc analysis identified significant differences between formulation 0 mol value and formulations 1.5 mol, 3 mol, 3.75 mol, and 4.5 mol values ($p=<0.05$). The significant differences between 0 mol and the rest of the formulations are a result of the increasing

*Physaria* oil concentration which would have been anticipated by the reduced Tg. However, the similar peel strength for the three formulations suggests an additional mechanism needs to be accounted for beyond the Tg.

Figure 18:
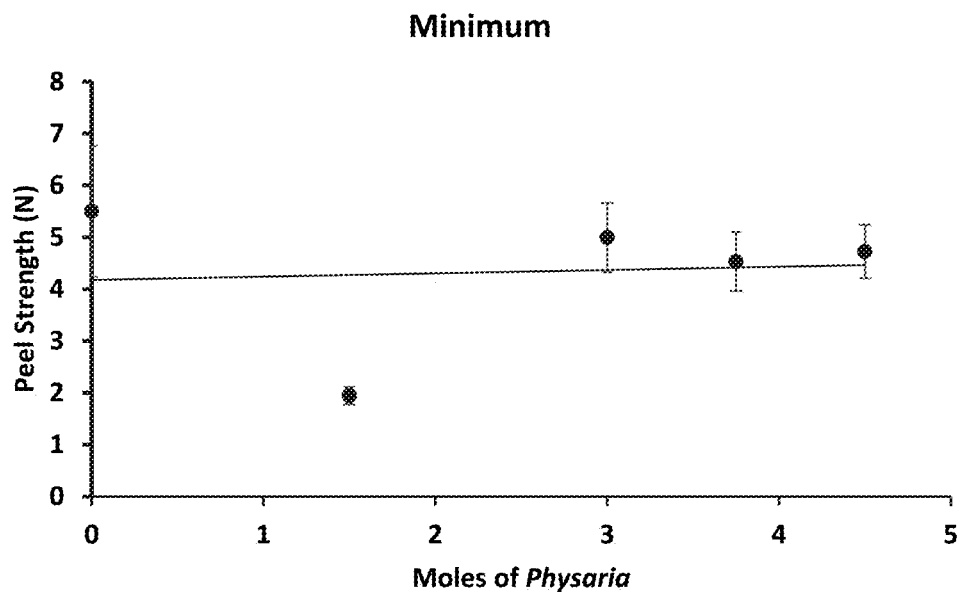
FIG. 18 is a plot of the minimum peel strength for the five different adhesive formulations of Example 2 between polyethylene and polyester films.
Figure 19:
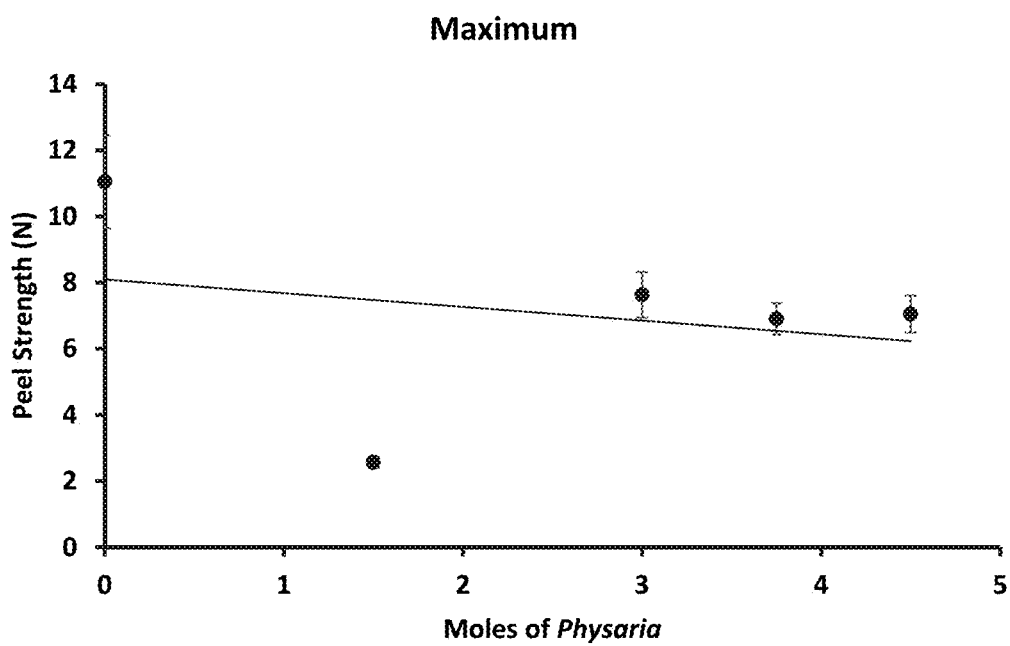
FIG. 19 is a plot of the maximum peel strength for the five different adhesive formulations of Example 2 between polyethylene and polyester films.
Figure 20:
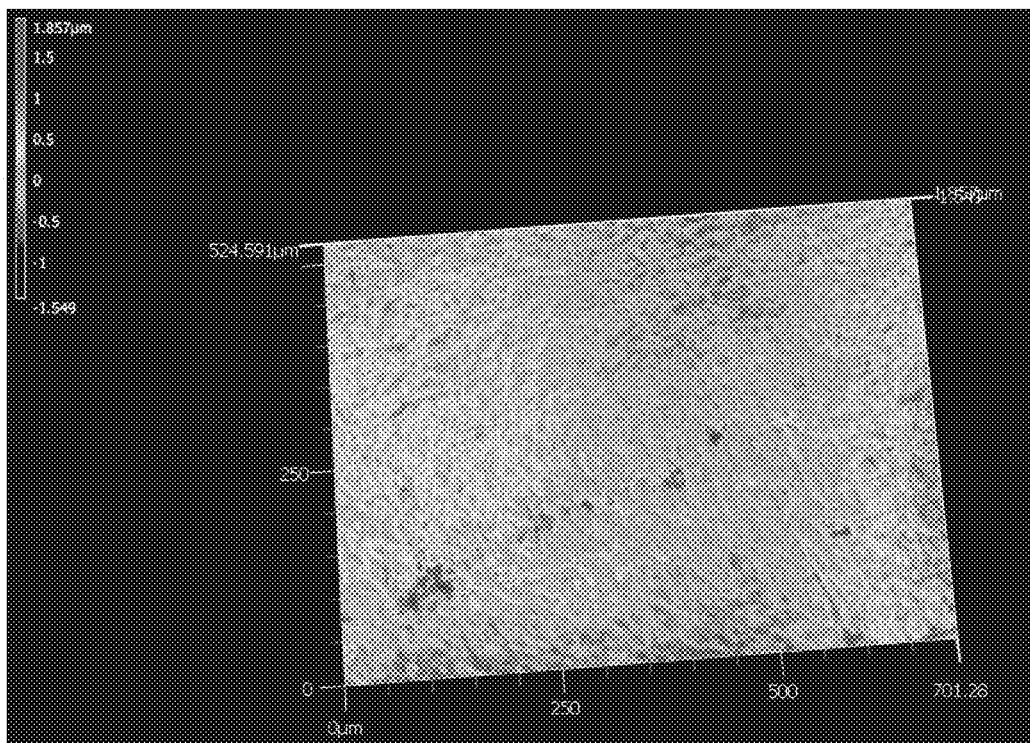
FIG. 20 is the scanning confocal laser micrograph of PE film used in the peel tests in Example 2 as received at 20× magnification.
Figure 21:
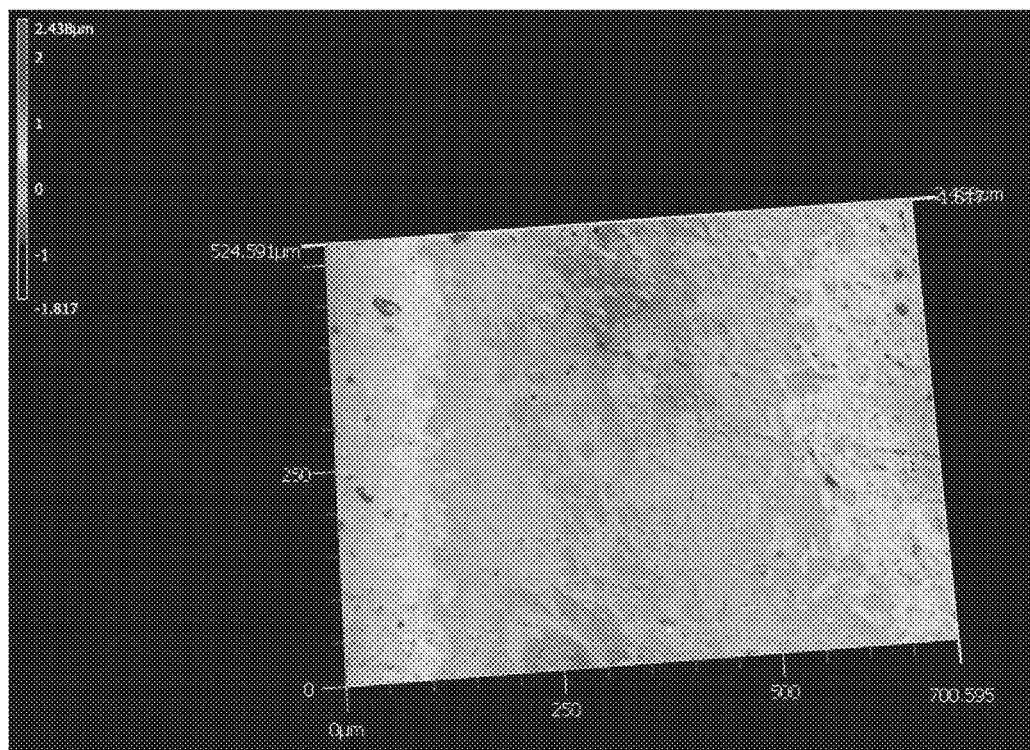
FIG. 21 is the scanning confocal laser micrograph of PET film used in the peel tests in Example 2 as received at 20× magnification.
Figure 22:
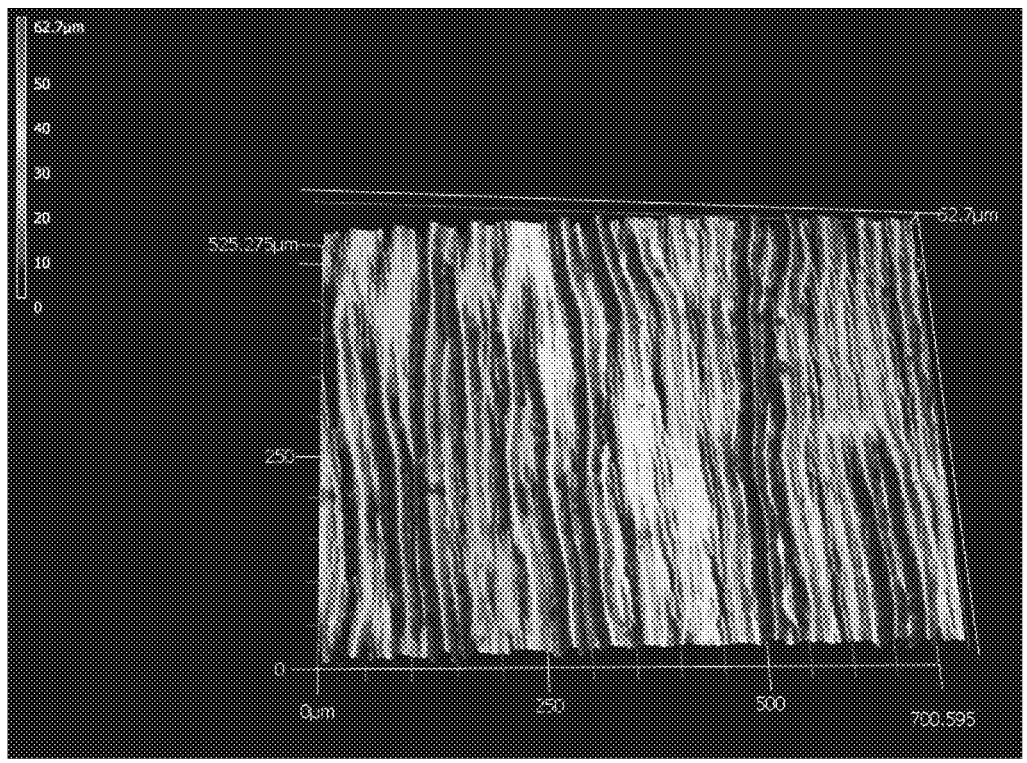
FIG. 22 is the scanning confocal laser micrograph of 0 mol *Physaria* oil adhesive formulation adhered to PE film at 20× magnification after peel testing.
Figure 23:
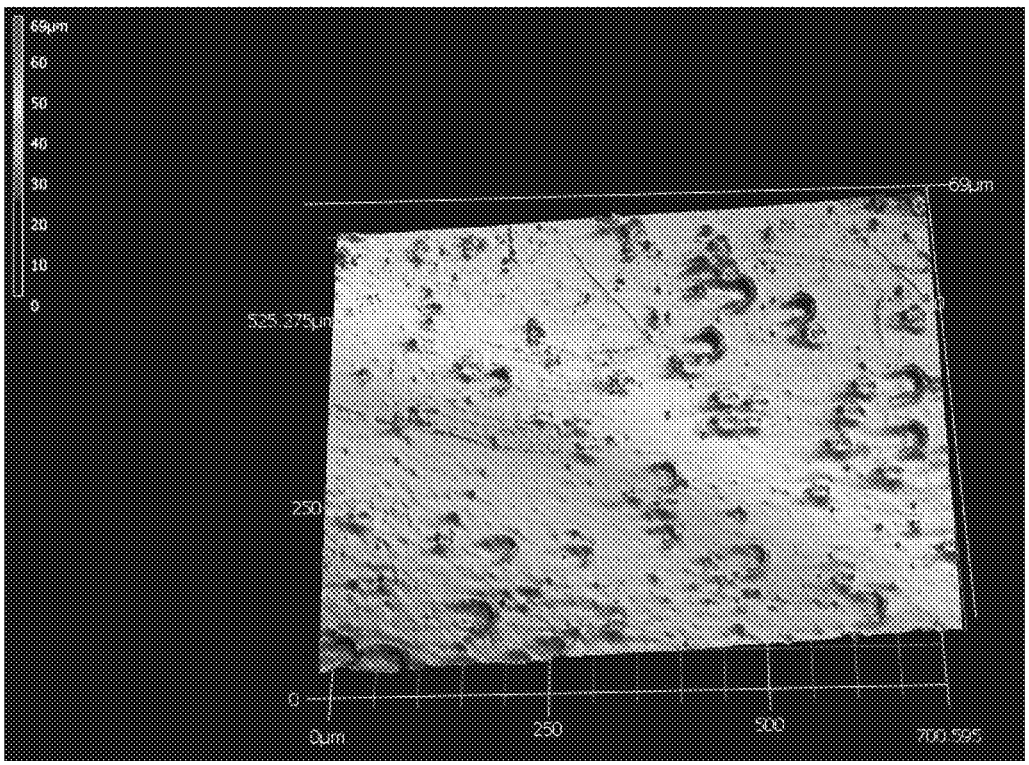
FIG. 23 is the scanning confocal laser micrograph of 0 mol *Physaria* oil adhesive formulation adhered to PET film at 20× magnification after peel testing.
Figure 24:
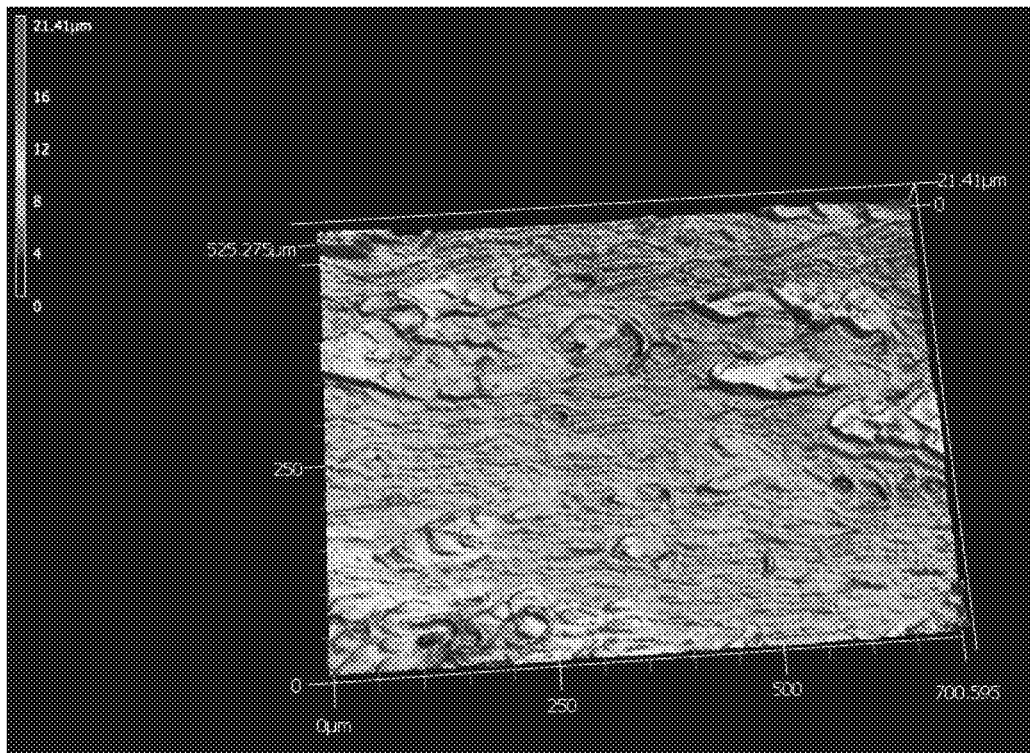
FIG. 24 is the scanning confocal laser micrograph of 1.5 mol *Physaria* oil adhesive formulation adhered to PE film at 20× magnification after peel testing.
Figure 25:
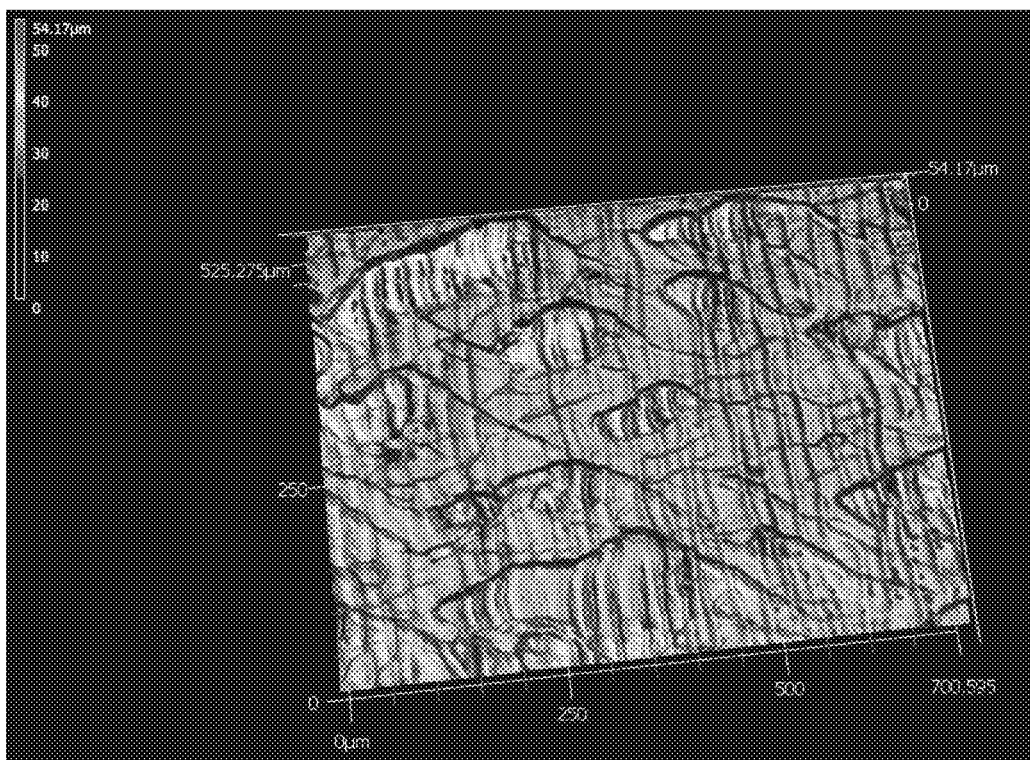
FIG. 25 is the scanning confocal laser micrograph of 1.5 mol *Physaria* oil adhesive formulation adhered to PET film at 20× magnification after peel testing.
Figure 26:
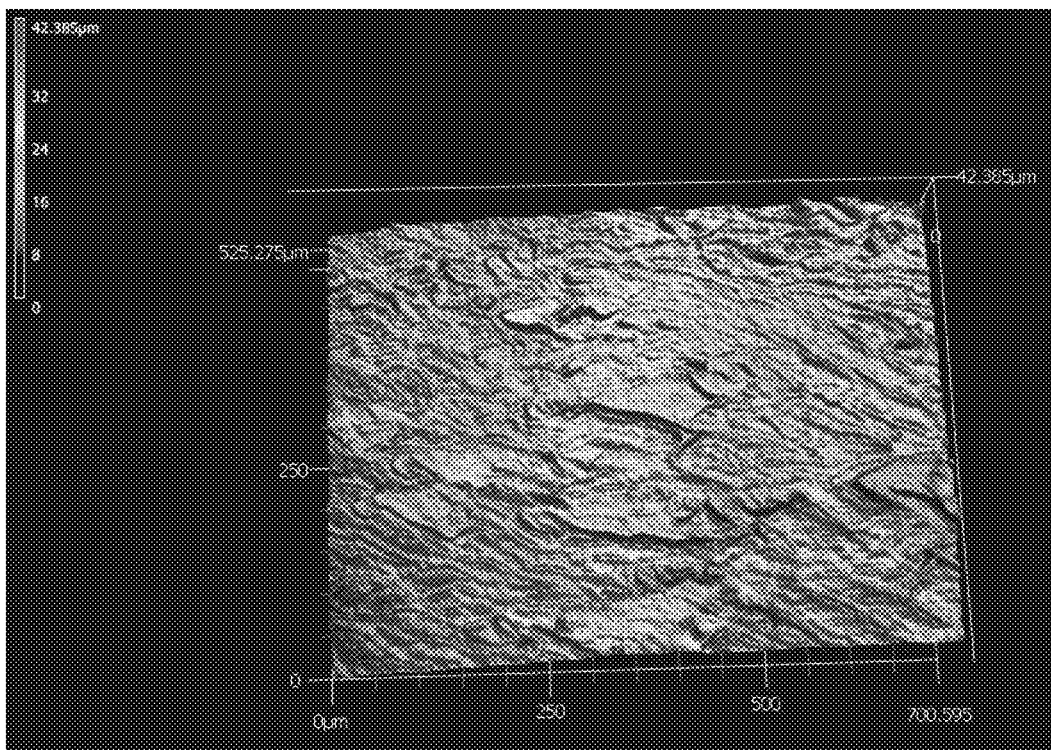
FIG. 26 is the scanning confocal laser micrograph of 3 mol *Physaria* oil adhesive formulation adhered to PE film at 20× magnification after peel testing.
Figure 27:
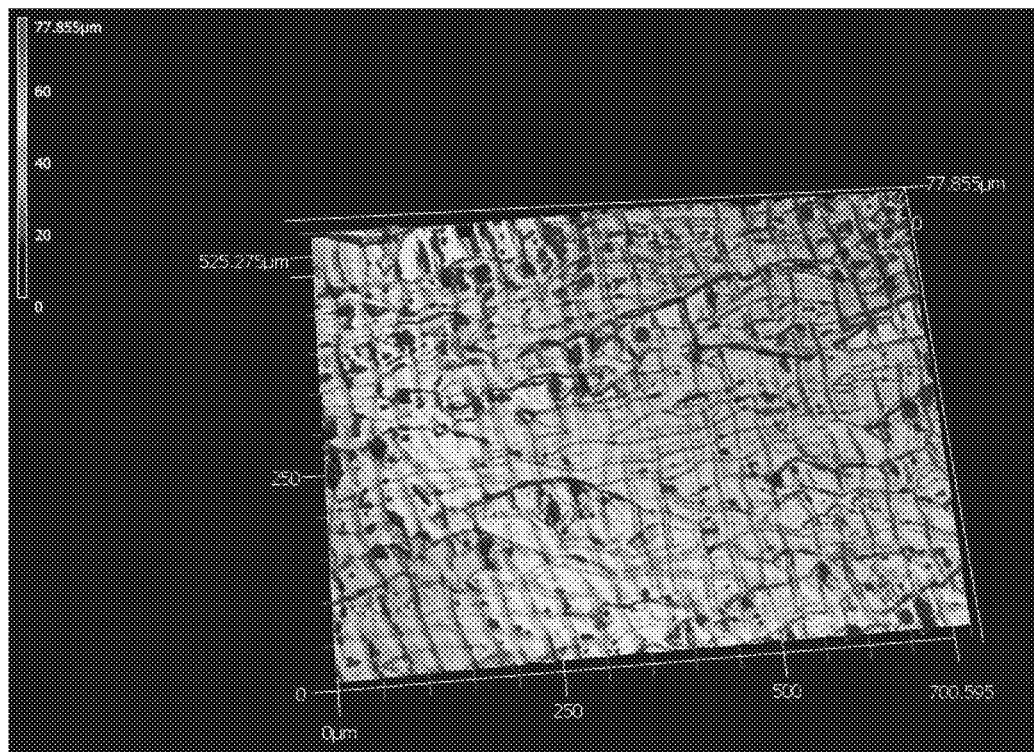
FIG. 27 is the scanning confocal laser micrograph of 3 mol *Physaria* oil adhesive formulation adhered to PET film at 20× magnification after peel testing.
Figure 28:
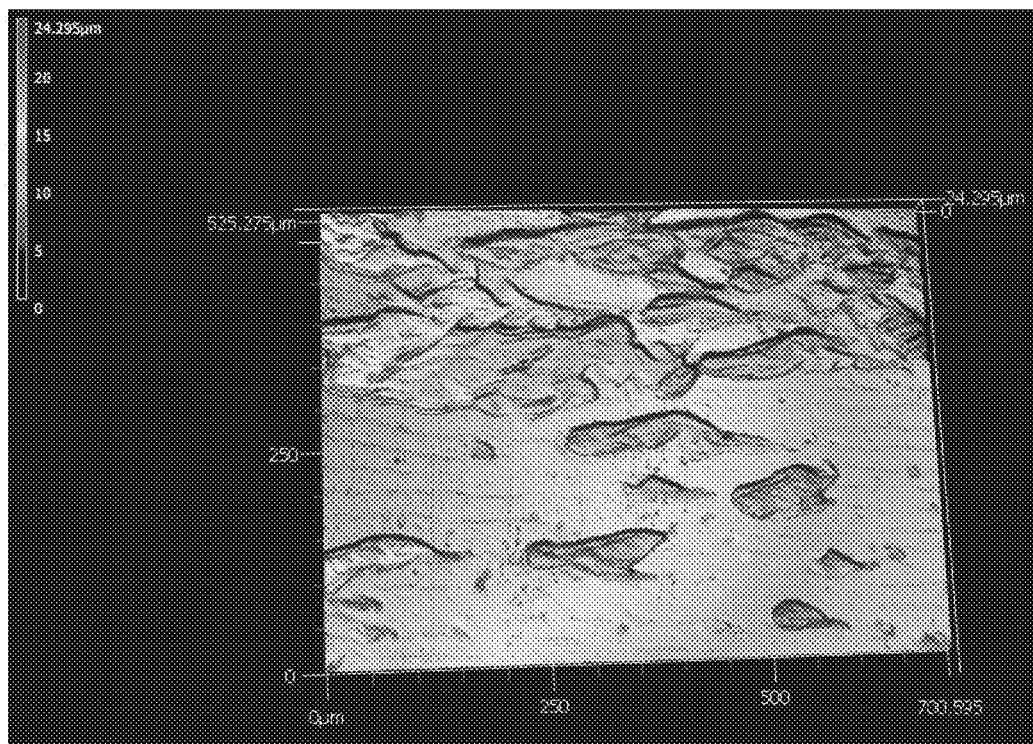
FIG. 28 is the scanning confocal laser micrograph of 3.75 mol *Physaria* oil adhesive formulation adhered to PE film at 20× magnification after peel testing.
Figure 29:
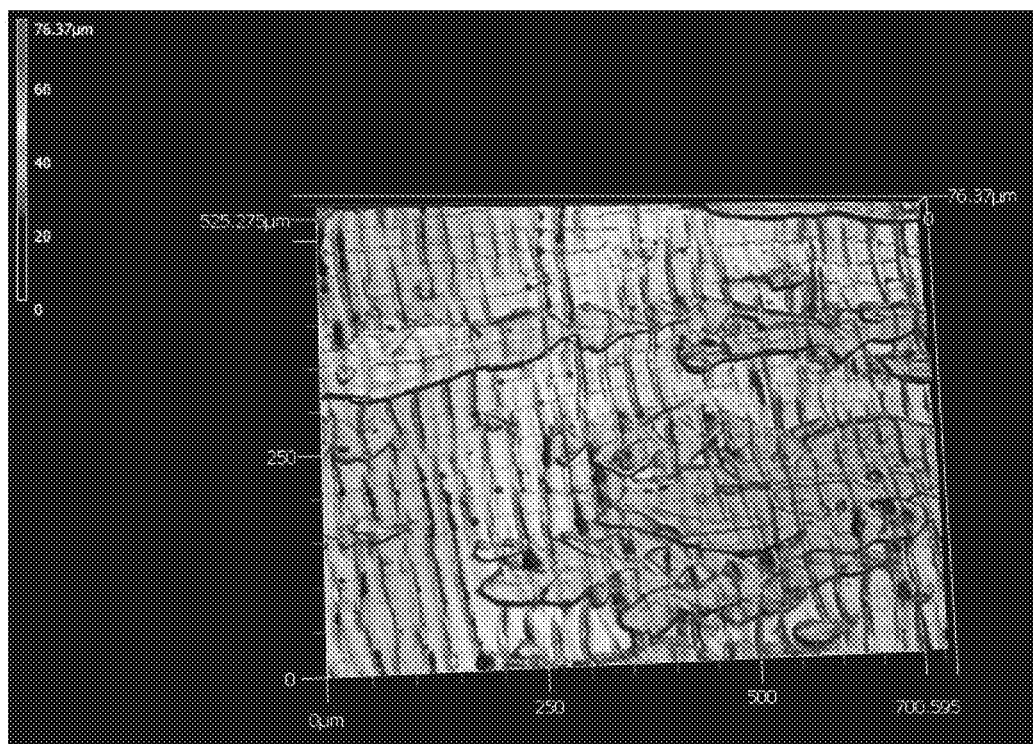
FIG. 29 is the scanning confocal laser micrograph of 3.75 mol *Physaria* oil adhesive formulation adhered to PET film at 20× magnification after peel testing.
Figure 30:
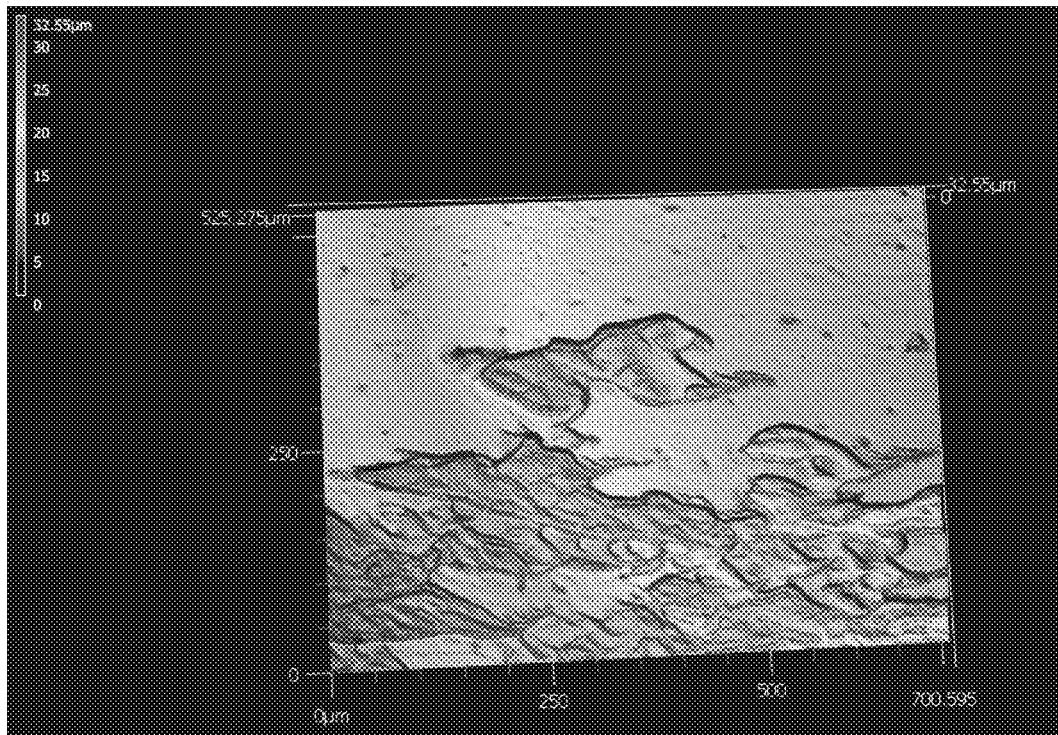
FIG. 30 is the scanning confocal laser micrograph of 4.5 mol *Physaria* oil adhesive formulation adhered to PE film at 20× magnification after peel testing.
Figure 31:
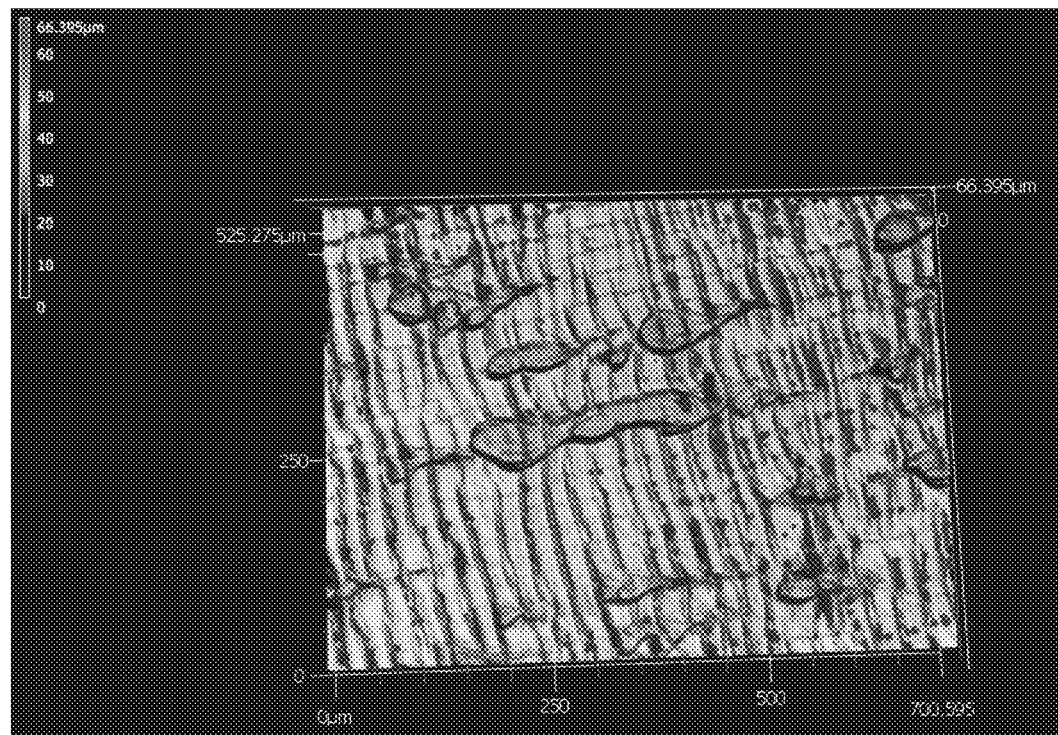
FIG. 31 is the scanning confocal laser micrograph of 4.5 mol *Physaria* oil adhesive formulation adhered to PET film at 20× magnification after peel testing.

The minimum peel strength between the formulations was comparable except for formulation 1.5 mol which was similar to the average peel strength values (FIG. 18). The formulation with no *Physaria* oil had the highest maximum peel strength of 11 Newton (N), but upon addition of more *Physaria* oil, the peel strength lowered similarly to the average values (FIG. 18).

Other researched bio-based resins had lower peel strength values than the adhesive formulations containing 0 mol, 3 mol, 3.75 mol, and 4.5 moles of *Physaria* oil. In comparison, Karami et al reported bio-based adhesives possessing a peel strength of 5.78 N which is nearly half of what is demonstrated here (Karami et al., *Polymers from Renewable Resources* 10:27-44 (2019), which is hereby incorporated by reference in its entirety). However, more research is needed to understand the seemingly anomalous peel strength of formulation containing 1.5 mol of *Physaria* oil. There is statistical evidence that the hydrocarbon side chain of *Physaria* oil influences peel strength by decreasing the strength of the adhesive formulations. With increased concentration of *Physaria* oil, there is a decrease in Tg values. Lower Tg values cause a decrease in the adhesive systems' peel strength and can result in an increase of cohesive failure (Jovanovic and Dube, *Ind. Eng. Chem. Res.* 44:6668-6675 (2005); Cassidy et al., *The Journal of Adhesion* 4:183-191 (1972), which are hereby incorporated by reference in their entirety). The addition of higher Tg components such as isosorbide to the formulations could be used to improve cohesive strength and is the subject of ongoing research.

Surface Roughness

Figure 32A:
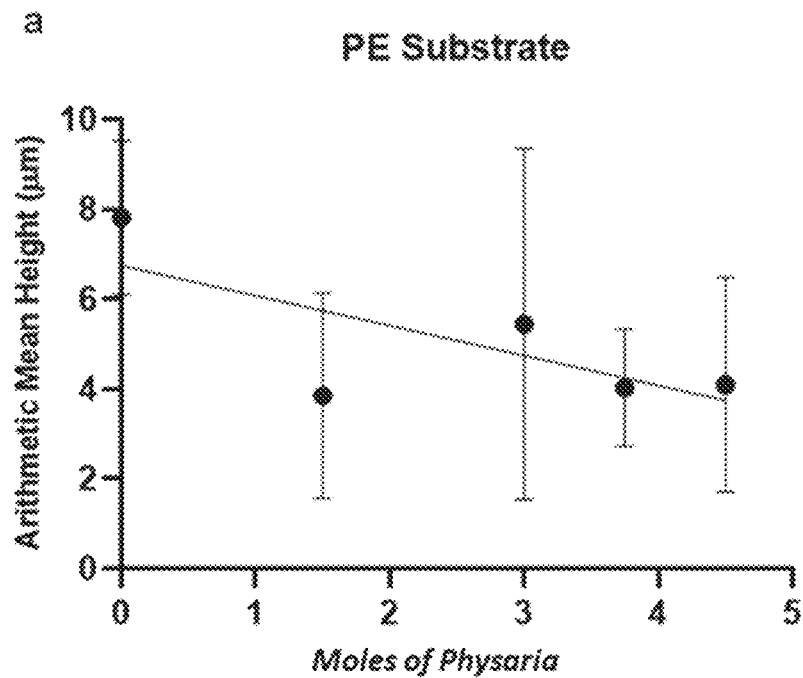
FIGS. 32A-32B are plots of the surface roughness measurements of PE (FIG. 32A) and PET (FIG. 32B) substrates after peel strength analysis.
Figure 32B:
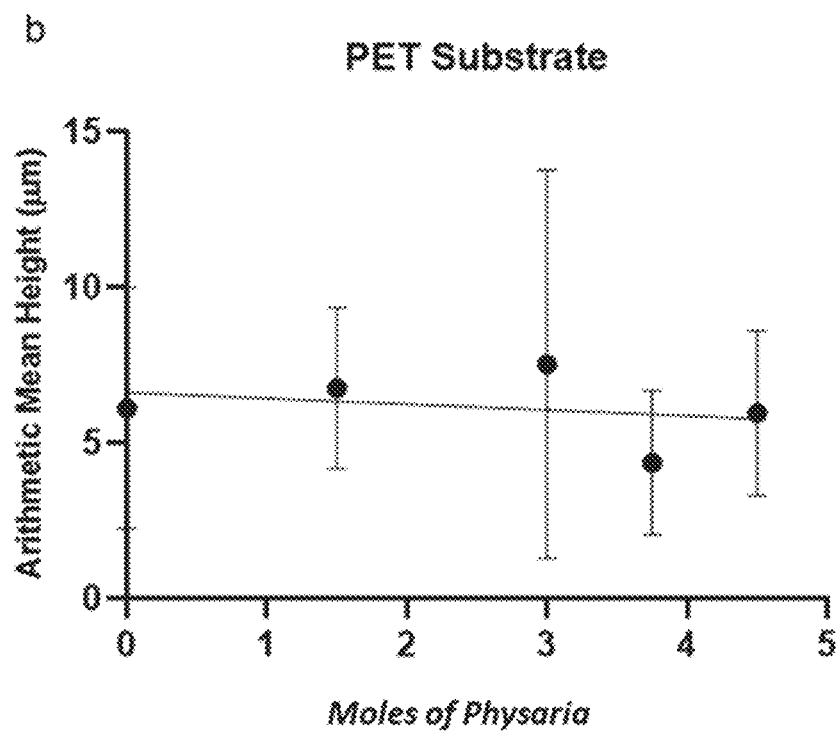

Surface roughness is a direct measurement of the surface's topography. Surface roughness measurement analysis was also used to determine the type of failure of the peel tested adhesive samples. Scanning confocal laser microscopy confirmed cohesive failure over adhesive failure during the peel tests. The surface morphology of each adherend after testing was noticeably different with increased roughness compared to the as-received film (0.307 μm and 0.444 μm for as-received PE and polyester films, respectively) indicating the presence of residual adhesive (FIGS. 20-32). As for the PET samples, there were no significant differences among the sample means as determined by one-way ANOVA ($p > 0.05$) (FIGS. 32A-32B). All the adhesive formulations failed cohesively rather than adhesively. This is expected due to the lower Tg values leading to a decrease in strength of the system, which causes an increase in cohesive failure (Cassidy et al., *The Journal of Adhesion* 4:183-191 (1972), which is hereby incorporated by reference in its entirety).

The peel tests have shown preliminary results that these formulations can be resealed, i.e., the layer could be an effective easy peel layer that can be resealed.

Plant extract oils are excellent renewable resources to replace petroleum-based components in coatings and adhesives due to their abundant, cost-effective, sustainable, and inherent chemical functional groups. However, chemical modification is often required prior to utilization in formulations and synthesis. This example sought to understand the influence of C18 side chains in naturally containing hydroxyl functional oils on physical properties of polyurethane adhesives intended for use in multilayer food packaging. Two oils containing different equivalents of hydroxyl functional fatty acids (f~2 *Physaria fendleri* oil; f~3 castor oil) were systematically varied in PU adhesive formulations to understand the influence of a C18 side chain on physical properties.

DSC results revealed that the C18 hydrocarbon side chain of *Physaria* oil decreases the measured Tg. This can likely be attributed to increasing free volume within the polymer structure. TGA results indicated that less than 2% of volatiles are given off before 200° C., providing support that changes in the Tg are attributed to the C18 side chain and not residual small molecule plasticization. Contact angle analysis of each adhesive formulation on each substrate determined that all formulations preferentially wetting each substrate (PE and PET) without significant influence on the composition. The measured peel strength was nearly twice that of other reported biobased adhesive formulations and the mode of failure was determined to be cohesive rather than adhesive. The addition of *Physaria* oil to polyurethane adhesives provides an opportunity to enter the market for bio-based adhesives for sustainable packaging within the food industry.

Example 3—Polymerization of *Euphorbia lagascae* Oil

Materials

Cyclopentyl methyl ether and sebacic acid were purchased from Alfa Aesar. Triethylamine and HPLC grade chloroform were purchased from Fisher Scientific. *Euphorbia Lagascae* Oil (EEW=675.50 g/Eq) was provided by the U.S. Department of Agriculture.

Polymerization Procedure

*Euphorbia lagascae* Oil-Sebacic Acid Initial Polymerization

At room temperature, *Euphorbia lagascae* Oil (ELO) was added with sebacic acid (SA) at various equivalent ratios, to a 20 mL scintillation vial containing a magnetic stir bar. To this solution, up to 0.5% wt of Triethylamine (TEA) was added as catalyst. In some experiments, the use of cyclopentyl methyl ether (CPME) was used in addition as a solvent (solvent:epoxy mass ratio of 2). Prior to reacting, the solution was stirred for 5 minutes to ensure adequate mixing of reactants. The solution was heated to 170° C. with stirring at 400 rpm using a temperature-controlled oil bath. The oil bath used a thermocouple and PID controller to control the heating mantle. The ELO-SA polymerization was carried out for two hours, and the product was cooled to room temperature. The resulting polymer was analyzed through Gel Permeation Chromatography (GPC) based on polystyrene standards run in chloroform.

*Euphorbia lagascae* Oil-Sebacic Acid-Sebacic Acid Secondary Polymerization

A secondary polymerization of ELO-SA step was completed to increase the molecular weight growth. At room temperature, to the ELO-SA was added sebacic acid (SA) at a known equivalent ratio, based on the molecular weight of ELO-SA, determined by GPC, to a 20 mL scintillation vial containing a magnetic stir bar. Prior to the reaction, the solution was stirred for 5 minutes to ensure adequate mixing of reactants. The solution was heated to 170° C. with stirring at 400 rpm using a temperature-controlled oil bath. The oil bath used a thermocouple and PID controller to control the heating mantle. The ELO-SA-SA secondary polymerization was carried out for two hours and the product was cooled to room temperature. The resulting polymer was analyzed through GPC based on polystyrene standards run in chloroform.

Results and Discussion of Example 3

The reaction proposed for epoxy-carboxyl reaction of *Euphorbia lagascae* Oil is shown in FIG. 2 where the addition of sebacic acid at an elevated temperature allows for the carboxyl functional group on sebacic acid to react with one or both of the epoxy functional groups on ELO (Ciannamea et al., "Pressure Sensitive Adhesives Based on Epoxidized Soybean Oil: Correlation Between Curing Conditions and Rheological Properties," *Journal of the American Oil Chemists' Society*, 95(4):525-532 (2018), which is hereby incorporated by reference in its entirety). Furthermore, using a base catalyst such as triethylamine can increase the rate of formation of epoxy-carboxyl linkages within the polymerization reaction (Blank et al., "Catalysis of the Epoxy-Carboxyl Reaction," *Journal of Coatings Technology* 74(926):33-41 (2002), which is here by incorporated by reference in its entirety). In order to increase the mobility of the monomers within the system, CPME was chosen as an appropriate solvent for the secondary polymerization due to the ELO-SA solubility.

The polymerization and secondary polymerization reactions of ELO were quantified primarily through GPC to determine molecular weight growth. The associated properties and molecular weight of these polymers were altered by varying the equivalent ratio of ELO to SA, the results of which are shown in Table 5. Since the polymerization method was a step-growth reaction, the monomer product unit of ELO-SA had a molecular weight of approximately 1597 Da.

TABLE 5

Molecular weight growth of ELO-SA polymerizations and ELO-SA-SA repolymerizations with varying equivalent ratios of reactants

| Sample | ELO:SA Equivalent Ratio | Number-average molecular weight, Mn (Da) | Estimated Chain Length | Reaction Aid Used | Physical State |
|---|---|---|---|---|---|
| ELO | — | 1597 | 1 | — | Oil |
| ELO-SA_1 | 0.66:1 | 6067 | 3.80 | TEA | Viscous liquid |
| ELO-SA_2 | 1:1 | 6402 | 4.01 | TEA | Viscous liquid |
| ELO-SA_3 | 1.5:1 | 5077 | 3.18 | TEA | Viscous liquid |
| ELO-SA-SA_4 | 1:1 | 7583 | 4.75 | TEA | Waxy solid |
| ELO-SA-SA_5 | 1:1 | 7881 | 4.93 | TEA, CPME | Waxy solid |

Figure 33:
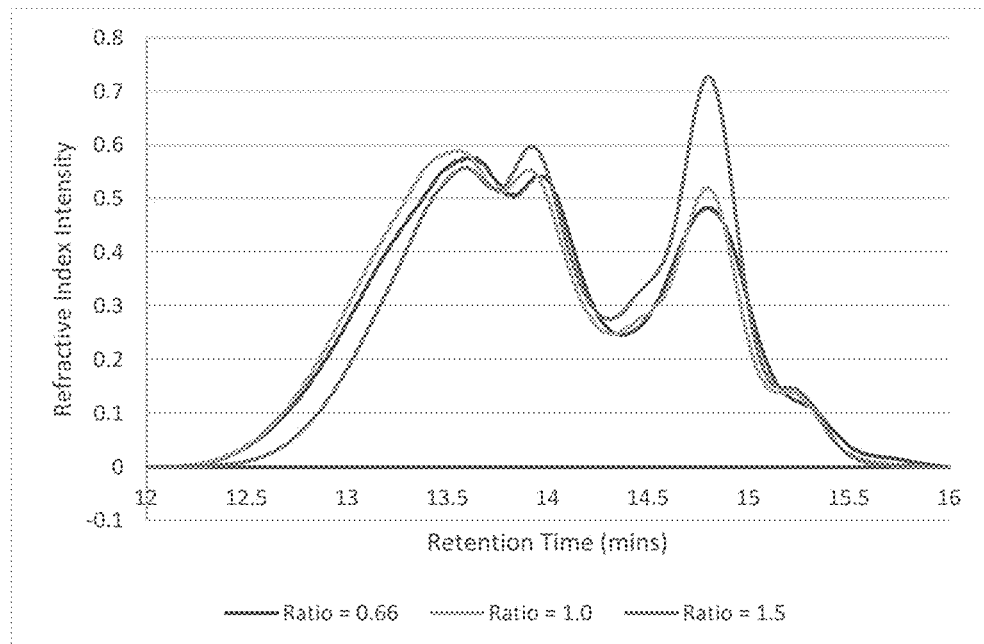
FIG. 33 is a plot of the direct comparison of the effect of varying ELO:SA ratio as determined through GPC. The doublet peak shown at approximately 13.5 minutes represents the product, ELO-SA. The singlet peak at approximately 14.75 minutes represents the residual ELO.

The comparison between varying epoxy monomer content is clearer when comparing the ELO-SA GPC results as shown in FIG. 33. As the ratio of ELO:SA increases, the persistence of more residual ELO is evidenced by the intensity of the peak at approximately 14.75 minutes. Despite the increase in molecular weight, the physical properties remained similar to that of ELO with the exception of an increase in viscosity and darkening in color from yellow to brown.

Figure 34:
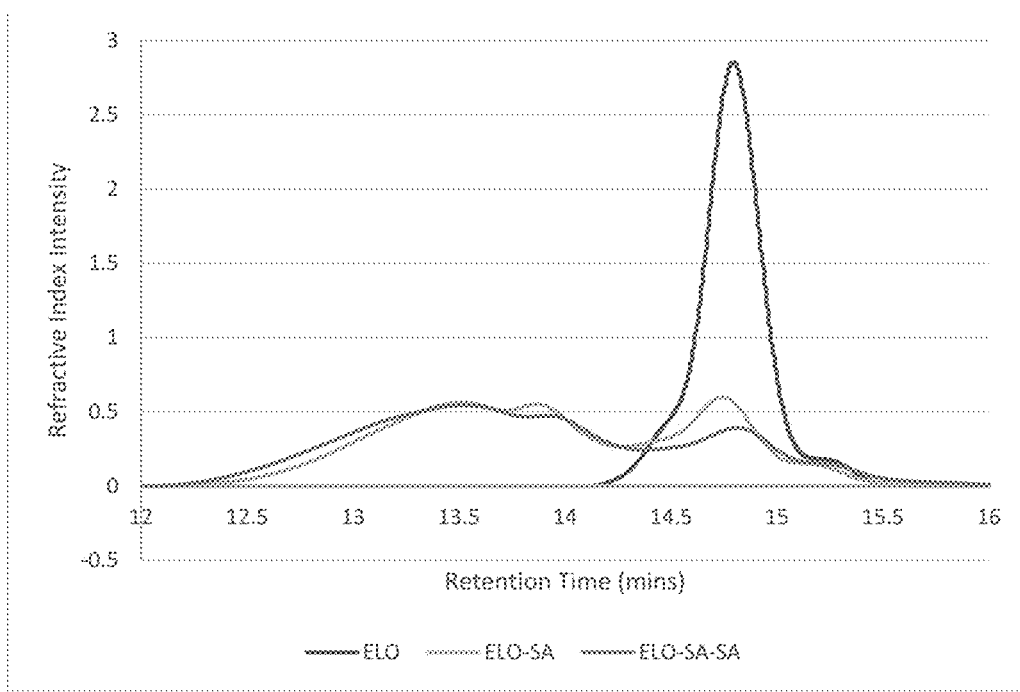
FIG. 34 is a plot of the direct comparison of repolymerization of ELO-SA as determined through GPC. The decrease in intensity of the residual ELO peak at approximately 14.75 mins contributes to the molecular weight increase in ELO-SA-SA.

With the secondary polymerization of ELO-SA, the molecular weight increased further with a distinct change in physical properties. The change from viscous liquid to waxy solid yield some tack to the product in addition to a lightening in color to off-yellow. The decrease in residual ELO is further quantified in FIG. 34, where the ELO-SA-SA peak is of a lower intensity than that of its precursor. Furthermore, the addition of solvent, CPME, slightly increased the molecular weight, as shown in the ELO-SA-SA entries in Table 5, since it provided increased chain mobility within the solution to allow further polymerization to occur.

The formulations disclosed in this application show potential as fluoro-free high-temperature coatings for rapid reheat convenience and food service applications. In addition, *Physaria* oil can serve as an alternative to castor oil in plant-based polyurethanes. The structure of the isocyanate groups in the Castor-*Physaria* coatings influenced the glass transition temperature of the Castor-*Physaria* coatings: Castor-*Physaria*-HDI>HMDI>IPDI, whereas, in the *Physaria* coatings, the glass transition temperature was not affected by isocyanate structure. Contact angle measurements demonstrates the hydrophobic characteristics of the Castor-*Physaria* coating, but the angle decreased when castor oil was taken out of the formulation. The Castor-*Physaria* coatings comprised of isocyanates and castor oil/*Physaria* blends show promise for high-performance properties. Without the addition of castor oil, the *Physaria* coatings have the potential to be used as an adhesive due to its soft, sticky nature. Further temperature stability analysis from dynamic mechanical analysis is needed to determine mechanical stability at high temperatures.

The biggest advantage to the ELO polymer is the inherent epoxy functionality from the natural oil. Epoxy functionality, even if made from vegetable oils such as soybean oil, must be chemically introduced. Epoxy functionality in particular is useful as it can react with many different functional groups, such as hydroxyl, anhydride, isocyanate, carboxylic acid, amine, thiol, etc. Other than the functionality and reactivity, the benefits of these ELO based polymers are similar to the polymers of *Physaria fendleri*.

Although preferred embodiments have been depicted and described in detail herein, it will be apparent to those skilled in the relevant art that various modifications, additions, substitutions, and the like can be made without departing from the spirit of the present application and these are therefore considered to be within the scope of the present application as defined in the claims which follow.

What is claimed:

1. A composition comprising:
   a polyester polymer produced by polymerizing triglycerides of *Euphorbia Lagascae* and one or more dicarboxylic acids.

2. The composition of claim 1, wherein the dicarboxylic acid is selected from the group consisting of sebacic acid, oxalic acid, succinic acid, adipic acid, cyclobutanedicarboxylic acid, hexahydroterephthalic acid, hexahydroisophthalic acid, phthalic acid, isophthalic acid, terephthalic acid, methylterephthalic acid, naphthalene-2,6-dicarboxylic acid, naphthalene-2,7-dicarboxylic acid, diphenylether dicarboxylic acid, diphenyl sulfonedicarboxylic acid, diphenoxyethanedicarboxylic acid, sodium 3-5-dicarboxybenzenesulfonate, glycolic acid, p-hydroxybenzoic acid and p-B-hydroxyethoxybenzoic acid.

3. The composition of claim 1, wherein the polyester polymer comprises the triglycerides of *Euphorbia Lagascae* to the dicarboxylic acid in a molar ratio ranging from 0.5:1 to 2:1.

4. The composition of claim 1, wherein the polyester polymer has a number average molecular weight ranging from 3000 grams per mole of polymer to 1,000,000 grams per mole of polymer.

5. The composition of claim 1, wherein the polyester polymer has a glass transition point ranging from −50° C. to 110° C.

6. An adhesive composition comprising:
the composition of claim 1 and
a solvent.

7. The adhesive composition according to claim 6 further comprising:
a tackifier and/or a plasticizer.

8. The adhesive composition according to claim 6 further comprising:
a filler selected from the group consisting of ground mica, talc, kaolin clay, calcium carbonate, calcium sulfite, colloidal silica, wollastonite, ballotini, hollow glass microspheres, glass, carbon and graphite fibers, zinc, titanium, zirconium, ground quartz, metallic silicates, and metallic powders.

9. A method of adhering substrates together, said method comprising:
providing a plurality of substrates;
applying the composition of claim 1 to one or more of the substrates; and
joining the substrates together with the applied composition.

10. The method of claim 9, wherein the composition is laminated between two substrate layers under conditions effective to form a seal.

11. A method of forming a polyester, said method comprising:
mixing triglycerides of *Euphorbia Lagascae* with a dicarboxylic acid in a solvent to form a solution and
reacting the solution under conditions effective to form a polyester polymer.

12. The method of claim 11, wherein said reacting is carried out at a temperature between about 20° C. to about 180° C.

13. The method of claim 11, wherein said reacting is carried out in the presence of a catalyst suitable to permit formation of the polyester.

14. The method of claim 13, wherein the catalyst is selected from the group consisting of triethylamine, triethylenediamine, antimony trioxide, tetrabutyl titanate (IV), titanium (IV) isopropoxide, tin (II) 2-ethylhexanoate, and dibutyltin (IV) oxide.

15. The method of claim 11 further comprising:
removing solvent from the mixture after formation of the polyester.

16. The method of claim 11, wherein the polyester has a number average molecular weight ranging from 3000 grams per mole of polyester to 1,000,000 grams per mole of polyester.

17. The method of claim 11, wherein the polyester has a glass transition point ranging from −50° C. to 110° C.

18. The composition of claim 1, wherein the one or more dicarboxylic acids is sebacic acid.

* * * * *